United States Patent
Khodapanah et al.

(10) Patent No.: US 10,117,487 B2
(45) Date of Patent: Nov. 6, 2018

(54) ENCASEMENT WITH DISPENSED SEAL

(71) Applicant: Otter Products, LLC, Fort Collins, CO (US)

(72) Inventors: Tofigh J. Khodapanah, La Jolla, CA (US); Minna L. Ranjeva, San Diego, CA (US)

(73) Assignee: Otter Products, LLC, Fort Collins, CO (US)

( * ) Notice: Subject to any disclaimer, the term of this patent is extended or adjusted under 35 U.S.C. 154(b) by 221 days.

(21) Appl. No.: 15/206,369

(22) Filed: Jul. 11, 2016

(65) Prior Publication Data

US 2016/0316875 A1    Nov. 3, 2016

Related U.S. Application Data

(63) Continuation-in-part of application No. 15/012,263, filed on Feb. 1, 2016, now Pat. No. 9,986,806.

(60) Provisional application No. 62/152,770, filed on Apr. 24, 2015, provisional application No. 62/110,368, filed on Jan. 30, 2015.

(51) Int. Cl.
*A45C 13/00* (2006.01)
*A45C 11/00* (2006.01)
*F16J 15/02* (2006.01)

(52) U.S. Cl.
CPC ............ *A45C 13/008* (2013.01); *A45C 11/00* (2013.01); *A45C 2011/002* (2013.01); *F16J 15/02* (2013.01)

(58) Field of Classification Search
CPC .......... F16J 15/02; F16J 15/021; F16J 15/022; A45C 2011/001–2011/003
USPC .................. 277/316, 543, 604, 632, 546
See application file for complete search history.

(56) References Cited

U.S. PATENT DOCUMENTS

| | | | |
|---|---|---|---|
| 3,124,502 | A | 3/1964 | Radke |
| 5,647,939 | A | 7/1997 | Gee et al. |
| 5,731,541 | A | 3/1998 | Bernd et al. |
| 6,420,649 | B1 | 7/2002 | Kahl et al. |
| 6,850,387 | B2 | 2/2005 | Daniel |
| 7,179,525 | B2 | 2/2007 | Dove |
| 8,342,325 | B2 | 1/2013 | Rayner |
| 8,531,834 | B2 | 9/2013 | Rayner |
| 2002/0122928 | A1 | 9/2002 | Botrie et al. |
| 2012/0314354 | A1 | 12/2012 | Rayner |
| 2014/0152890 | A1 | 6/2014 | Rayner |
| 2014/0339104 | A1 | 11/2014 | Magness |

*Primary Examiner* — Anthony Stashick
*Assistant Examiner* — Mollie Impink

(57) ABSTRACT

A protective encasement for an electronic device includes members that clasp together and a dispensed seal disposed on an inside surface of one of the members to form a watertight barrier between the member and a surface of the installed electronic device. The dispensed seal may comprise an elastomeric material dispensed on and adhered to the inside surface of the encasement. A first overlap region of the dispensed seal may overlap a second overlap region of the dispensed seal at an overlap point to form a closed loop. The closed loop may have a substantially uniform thickness to form the watertight barrier. The first and second overlap regions may each have reduced thicknesses that are less than the uniform thickness, but a combined thickness of the overlap regions at the overlap point substantially equals the uniform thickness to complete the closed loop of the seal.

18 Claims, 19 Drawing Sheets

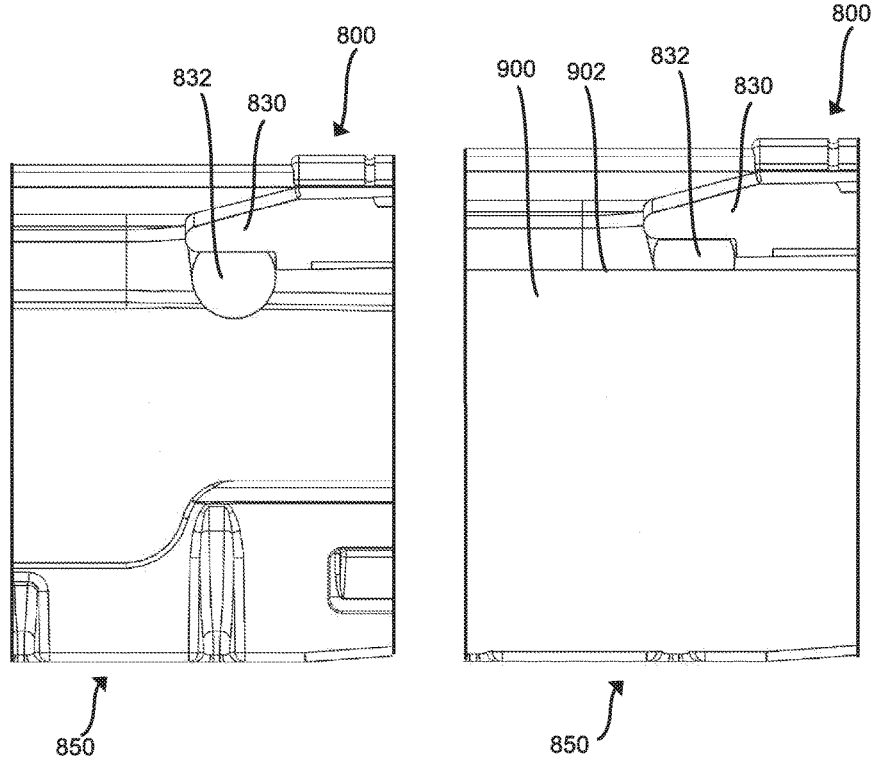

ENCASEMENT WITH DISPENSED SEAL

CROSS-REFERENCE TO RELATED APPLICATIONS

This application is a continuation in part of U.S. patent application Ser. No. 15/012,263 filed Feb. 1, 2016, which claims priority benefit to U.S. Provisional Patent Application No. 62/110,368, filed Jan. 30, 2015, and to U.S. Provisional Patent Application No. 62/152,770, filed Apr. 24, 2015, each of which is incorporated by reference herein.

FIELD

This disclosure relates generally to waterproof and water-resistant enclosures and encasements that include a seal.

BACKGROUND

Housings and enclosures are often created for the purpose of protecting their contents from elements such as water, particulates, or other environmental contaminants. Such housings and enclosures may require addition of a seal, such as a gasket or o-ring, that is interposed between two opposing surfaces of the housing or enclosure to block any gaps between those surfaces against the intrusion of environmental contaminants.

Adding seals to housings (e.g. a housing for electronic device components) and enclosures (e.g. an enclosure configured to encase an electronic device housing) is accomplished using tooling methods that add time, expense, and complexity to manufacturing of a housing or enclosure. In one method, a seal may be added to an enclosure part by overmolding or insert-molding an elastomer directly onto a base material, such as a rigid or semi-rigid plastic resin. Such techniques require creation of a separate tool for the overmold that must conform to the enclosure part receiving the sealing material. In another method, a seal is fabricated separately and placed or adhered to a sealing seat where the seal is needed. As with overmolded seals, using separately molded seals requires creation of an individual tool for the seals in addition to the encasement part itself. In addition, enclosure seals that are fabricated separately can create problems for a user that repeatedly opens and closes the enclosure, as the seal can fall out and become damaged or lost.

While seals can be manufactured for enclosures and housings using tooling techniques, the separate tools required by these methods are costly and time-consuming to create. Each sealing tool must be shaped to the part and adjusted to create an appropriate seal for a given enclosure part. In addition, if a manufacturer modifies the geometry of the part during production, the manufacturer must also make a new tool for the seal, expending additional time and expense. Moreover, if the manufacturer wants to increase the output of parts, additional identical tools must be generated, further increasing the time and expense of production.

Thus, it is desirable to have the ability to add a seal to enclosures and housings, while being able to quickly and easily adapt the seal geometry to modifications made in the sealing surface geometry of the housing or enclosure without the expense or inconveniences of building additional tooling.

SUMMARY

This application provides enclosures and encasements with formed-in-place seals, as well as methods for dispensing a non-removable seal onto a surface of an enclosure or housing. Until recently, dispensing technology has lacked the capability to dispense material accurately enough to create a useful seal. The enclosure seals described herein are dispensed in a manner to minimize the peaks and valleys formed when two ends of a seal are joined. This minimizes the probability of a leak path between the interior and exterior of a sealed enclosure.

In one aspect, a protective encasement includes a first member having a perimeter portion and a second member having a perimeter portion that corresponds with the perimeter portion of the first member. The members may each include a channel and/or a wall disposed proximate their respective perimeter portions. The members may also include clasping features. The clasping features may be configured for interfacing to removably clasp the members together to removably encase the electronic device. The protective encasement further includes a dispensed seal disposed on an inside surface of one of the members to form a watertight barrier between the member and a surface of the installed electronic device when the members are removably clasped together. The dispensed seal may comprise an elastomeric material dispensed on and adhered to the inside surface of one of the case members. The dispensed seal may include a first end and a second end. A first overlap region of the dispensed seal may overlap a second overlap region of the dispensed seal at an overlap point to form a closed loop. The closed loop may have a substantially uniform seal thickness to form the watertight barrier, particularly as it pertains to for a barrier or seal with a planar surface. The first and second overlap regions each have reduced thicknesses that are less than the uniform seal thickness. A combined thickness of the first overlap region and the second overlap region at the overlap point substantially equals the uniform seal thickness to complete the closed loop having a substantially uniform seal thickness.

In another aspect, protective enclosures and encasements for electronic device housings are disclosed. The protective enclosures and encasements may have a first member and a second member (such as a top and bottom member), each of which has a perimeter portion. The first and second members also each have an inner surface that faces the electronic device housing. In some embodiments, the first or second member may have a channel on its perimeter portion, and the other of the first or second member may have a wall on a perimeter portion. In some embodiments, the first or second member may have a first wall on its perimeter portion, and the other of the first or second member may have a second wall on its corresponding perimeter portion. The channel and the wall (or the first and second wall) each include a clasping feature that removably clasps the first and second members together.

The protective enclosures and encasements of this disclosure also include a non-removable seal on the inner surface of the first or the second member. The non-removable seal may be within the channel, on the perimeter portion of the first or second member, or disposed on a first or second wall (if the enclosure member does not have a channel). The non-removable seal is adhered to the inner surface of the first or second member, and may be formed from a flowable elastomeric material. The non-removable seal includes a first portion forming an inclined or ramped configuration from a first point to a second point on the inner surface of the enclosure or encasement member, a second portion having a thickness, volume or cross-sectional area that is constant from the second point to the first point on the inner surface of the enclosure or encasement member, and a third portion disposed on the surface of the first portion of the non-removable seal. The third portion may have a combined thickness, volume, or cross-sectional area that is substantially equal to the thickness, volume, or cross-sectional area of the second portion of the non-removable seal.

In another aspect, the disclosure provides protective enclosures and encasements having a top member and a bottom member, each having an inner surface that faces the housing of an electronic device when enclosing or encasement the electronic device. The top member includes an inside edge defining an aperture that exposes a touch-sensitive display of an installed electronic device. In certain instances, the top or bottom member may have a channel and corresponding wall that interface via respective first and second clasping features. In some embodiments, the top and bottom members may include first and second corresponding walls that interface via first and second clasping features.

The foregoing aspect of protective enclosures and encasements may include a non-removable seal disposed on the inner surface of the top member proximate the inside edge. The non-removable seal is formed from a flowable elastomeric material, and is compressed against the front surface of the electronic device housing proximate the touch-sensitive display when an electronic device is installed in the protective enclosure or encasement. The non-removable seal includes a first portion forming an inclined or ramped configuration from a first point to a second point on the inner surface of the enclosure or encasement member, a second portion having a thickness, volume or cross-sectional area that is constant from the second point to the first point on the inner surface of the enclosure or encasement member, and a third portion disposed on the surface of the first portion of the non-removable seal. The third portion may have a combined thickness, volume, or cross-sectional area that is substantially equal to the thickness, volume, or cross-sectional area of the second portion of the non-removable seal.

In some embodiments of the foregoing aspects, the non-removable seal may include a secondary structure adhered to the non-removable seal. The secondary structure may include a first portion forming an inclined or ramped configuration from a third point to a fourth point on the inner surface of the enclosure or encasement member, a second portion having a thickness, volume or cross-sectional area that is constant from the fourth point to the third point on the inner surface of the enclosure or encasement member, and a third portion disposed on the surface of the first portion of the secondary structure. The third portion may have a combined thickness, volume, or cross-sectional area that is substantially equal to the thickness, volume, or cross-sectional area of the second portion of the secondary structure.

In yet another aspect, the disclosure provides methods for dispensing or extruding a non-removable seal onto an encasement or enclosure member. The method includes providing a first enclosure member, and exposing the first enclosure member to ultraviolet radiation at a radiant exposure of between about 0.5 and about 2.0 joules/cm². A dispensing or extruding nozzle of a seal-dispensing apparatus is positioned proximate the inner surface, and moved from a first point to a second point while dispensing an increasing volume of flowable elastomeric material to form a first portion that is ramped or inclined. The dispensing or extruding nozzle continues moving laterally along the enclosure or encasement member between the second and first points while dispensing a substantially constant volume of the flowable elastomeric material so as to form a second portion of seal. The dispensing or extruding nozzle continues moving between the first and second points, dispensing or extruding a decreasing volume of the flowable elastomeric material so as to produce a third seal portion. The first seal portion and the third seal portion have a combined thickness, volume, or cross-sectional area substantially equal to the thickness of the second seal portion. Dispensing of the flowable elastomeric materials ceases or ends before the dispensing or extruding nozzle reaches the second point for the second time, while movement of the dispensing or extruding nozzle continues to at least the second point after dispensing has ended or ceased.

The summary of the technology described above is non-limiting and other features and advantages of the invention will be apparent from the following detailed description of the invention, and from the claims.

BRIEF DESCRIPTION OF THE FIGURES

FIG. 8C is another partial side sectional view of the clasped top and bottom members of FIG. 8B, showing an inside edge and a second dispensed seal.

FIG. 8D is a partial side sectional view of the clasped top and bottom members of FIG. 8C, showing an inside edge and a second dispensed seal partially compressed against an installed electronic device.

DETAILED DESCRIPTION OF THE DISCLOSURE

Figure 1A:
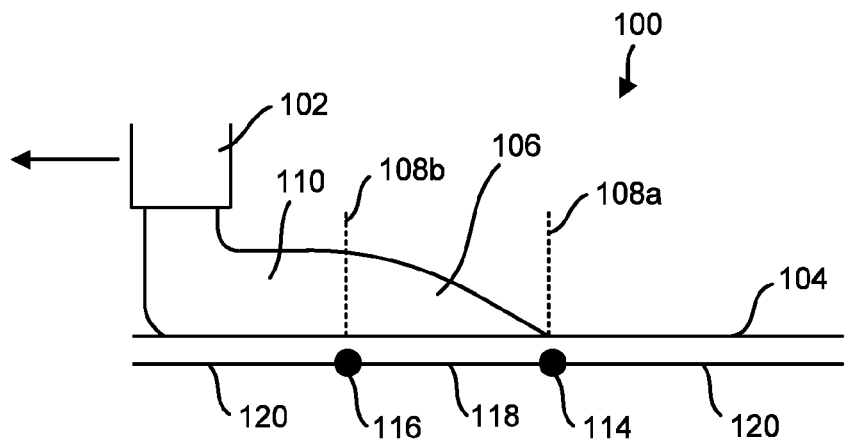
FIG. 1A shows a side view of a portion of a non-removable seal that has been dispensed on a surface along a first path and partially dispensed along a second path.

The present disclosure relates generally to enclosure and encasement members that form a waterproof enclosure or encasement when associated with one another, wherein non-removable seals part of the enclosure or encasement are formed-in-place or flowed-in-place seals that are dispensed using a dispensing device, or extruded with an extrusion device. The present disclosure is also directed to methods of creating formed-in-place seals on an enclosure or encasement member surface, such that no mounds or valleys are formed in the seal that could compromise the seal when exposed to water, dust, or other contaminants. While many of the examples herein are described with respect to an enclosure or encasement being waterproof or watertight, the techniques disclosed herein may be used to create enclosures or encasements that are not absolutely waterproof and may be water-resistant to varying degrees.

The term "about" as used herein in reference to quantitative measurements, refers to the indicated value plus or minus 10% of the indicated value. The phrases "substantially equal to" and "substantially the same as" are used herein in reference to a dimension of two different items or portions of items, such as the thickness of two different portions of a seal, and refers to the fact that the two items or portions of items each have a dimension value that is within 10% of the other. For example, if a first portion of a seal has a thickness that is substantially equal to a second portion of a seal that is 0.5 mm thick, the first portion of the seal may have a thickness between and including 0.45 mm and 0.55 mm.

The term "thickness" of a seal or secondary structure, as used herein, refers to the distance between a first point on the surface of the object where the seal or secondary structure is positioned, and a second point (e.g. an apex) on the surface of the seal or secondary structure. The surface on which the seal or secondary structure is positioned may be a surface of an enclosure member or a surface of a seal. The first point on the surface is about equidistant between the points where the sides of a seal or secondary structure meet the surface. The first point and the second point define a line that is oriented at about a 90-degree angle to the plane of the surface upon which the seal or secondary structure is positioned. If the surface on which the seal or secondary structure is positioned is curved, then the line between the first point and the second point is oriented at about a 90-degree angle to a line between the points where the sides of the seal or secondary structure meet the surface.

As disclosed below, non-removable seals of the present technology have portions, segments, or lengths, some of which may overlap each other to create a thickness with a minimum of peaks and valleys. For example, in one embodiment, the seal may have three lengths, portions, or segments (see below and FIGS. 1A-1C). One portion or length is in a ramped configuration from a first point to a second point on the inner surface of the enclosure or encasement member. In other words, the thickness of the first length at the first point is less than the thickness of the first length at the second point. Accordingly, the height of the first length relative to the inner surface of the enclosure or encasement member increases along the ramp. A second length of seal extends from where the first ramped portion ends (the region of maximum thickness of the ramp, at the second point on the inner surface of the encasement or enclosure member) to where the first portion begins (at the first point on the inner surface of the encasement or enclosure member). The thickness of the second portion is substantially constant along its length between the second point and the first point. Finally, the third portion of seal overlays the ramp of the first portion, forming an inverted ramp configuration between the first point and the second point. The third portion and the first portion together have a combined thickness substantially equal to the thickness of the second portion of seal. The ramped configuration of the first portion combined with the inverted ramp configuration of the third length minimizes the presence of peaks or valleys where the first and third portion of seal meet.

In order to dispense a seal on an enclosure member, a seal-dispensing device or apparatus is used. The seal-dispensing device has a dispensing or extruding nozzle coupled with a reservoir containing a flowable seal-producing material. Seals and secondary structures on such seals may be dispensed using robotic dispensing systems, such as the PVA 350 benchtop dispensing system with a VPX 500 valve (from Precision Valve and Automation, Cohoes, N.Y.). Such robotic dispensers may be programmed to dispense a segment of elastomeric material, sometimes also referred to as a bead, on a surface with a high degree of location accuracy, as well as accurate control of speed changes and/or starting and stopping the flow of elastomer out of the dispensing tip. In order for a dispensed elastomer to form a coherent and useful seal around a perimeter surface in a single pass, the beginning and end of the dispensed seal must have a height similar to the remainder of the bead in the vicinity. If the junction region (where the dispensed seal is started and ended) is much higher than or much lower than the rest of the bead, then the seal is much less effective in the junction region and provides a leak path for liquids to move through the seal.

When the seal-dispensing device is operated, the dispensing or extruding nozzle is positioned proximate the inner surface of the perimeter portion of the first enclosure member. The dispensing or extruding nozzle then moves relative to the perimeter portion of the first enclosure member along the perimeter portion from a first point to a second point. For example, FIG. 1A shows a side view of a non-removable seal 100 that has started being dispensed by a dispensing or extruding nozzle 102 along an enclosure member or encasement member surface 104 of an enclosure or encasement member. The arrow shows the movement direction of dispensing nozzle 102 as the elastomer is being dispensed. While dispensing nozzle 102 moves from the first point to the second point on the first enclosure member, dispensing nozzle 102 dispenses an increasing volume of the flowable seal-producing material so as to produce a first length or portion of seal. A first portion or first segment 106 of the non-removable seal 100 is inclined relative to enclosure member surface 104 to form a ramp, and is demarcated by dotted lines 108a and 108b. The volume of first portion 106 increases along first path 118 in the direction of the arrow. First portion 106 begins at a first point 114 and is created along a first path 118 until reaching a second point 116 (see, e.g. FIG. 10). After the dispensing nozzle 102 reaches the second point 116, the dispensing nozzle 102 follows a second path 120 to form a second portion or segment 110 of non-removable seal 100. First portion 106 is configured like a ramp, such that when the dispensing nozzle deposits another portion of elastomer on the surface of the first portion 106 (see below and FIGS. 1B-1C) the additional portion forms an inverted ramp or declined configuration. The combined thickness of the first and third portions of the seal do not have any substantial depressions or protrusions relative to the second portion, which can form a path for leakage of liquids, dust, and other contaminants.

The inclined ramp geometry of first portion 106 may be created using one or more different techniques. First, the dispensing nozzle may dispense elastomer at a constant flow rate, and move at a decreasing rate of movement along the first path 118, thereby steadily dispensing an increasing volume of elastomer on the enclosure member surface 104 per unit length. For example, the dispensing nozzle may begin moving at a rate of about 40 mm/sec., and then decrease speed to about 20 mm/sec. Second, the dispensing nozzle may dispense elastomer at an increasing flow rate as the dispensing nozzle moves along the first path 118, but maintain a constant rate of movement along the first path 118. Third, the rate of movement of the dispensing nozzle may decrease along the first path 118 and the flow rate of elastomer from the dispensing nozzle 102 may increase as the dispensing nozzle moves along the first path 118. Fourth, the distance of the dispensing nozzle from the enclosure member surface may be increased as the dispensing nozzle dispenses seal-producing material and moves relative to the enclosure member surface. When the dispensing nozzle moves towards the enclosure member surface, along an axis perpendicular to a plane of the enclosure member surface, the volume or cross-sectional area of elastomeric material being dispensed from the dispensing nozzle across a given length or distance is increased.

Figure 1B:
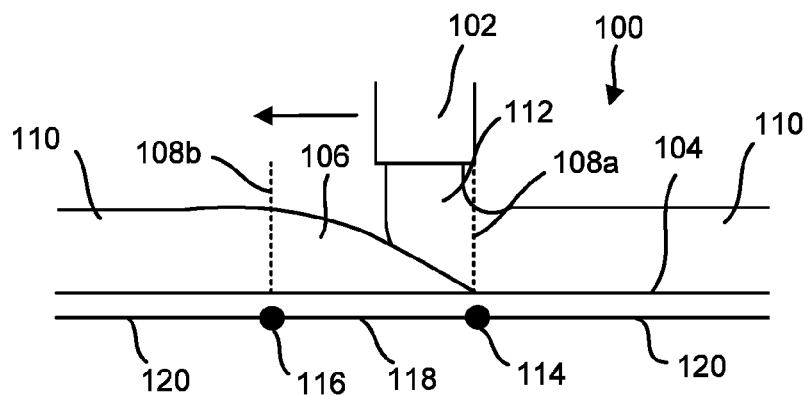
FIG. 1B shows a side view of the non-removable seal in FIG. 1A partially dispensed along a first path on top of itself.

After dispensing the ramped first portion of the seal, the dispensing nozzle then continues moving to dispense a second portion or segment of seal. The second portion of seal dispensed from the dispensing nozzle has a thickness that is substantially constant along its length. Second path 120 lies between second point 116 and first point 114 on enclosure member surface 104 (see also schematic diagram in FIG. 2). The first point 114, second point 116, first path 118 and second path 120 are indicated in the schematic line underneath non-removable seal 100. In order to dispense the second portion 110 of seal, dispensing nozzle 102 continues moving relative to the enclosure member surface 104 from the second point 116 to the first point 114. Dispensing nozzle 102 dispenses a constant volume of the flowable seal-producing material while the dispensing nozzle 102 moves laterally across enclosure member surface 104. FIG. 1B shows a side view of non-removable seal 100 after the dispensing nozzle 102 has completed the circuit of the second path 120 around enclosure member surface 104 to form second portion 110. Second portion 110 has a specified thickness, volume, and cross-sectional area between second point 116 and first point 114. In FIG. 1B, dispensing nozzle 102 is recapitulating its movement along first path 118 to form third portion 112 of non-removable seal 100.

A third portion 112 of non-removable seal 100 is then dispensed by the moving dispensing nozzle 102 along at least a portion of the first path. Dispensing nozzle 102 continues to move relative to the first enclosure member along the perimeter portion from the third point to a fourth point, retracing the path of the first length of seal. In FIG. 1B, third portion 112 is formed along the first path 118 and positioned on the surface of the first portion 106 in an declined geometry that mirrors the inclined or ramped geometry of the first portion 106. The configuration of third portion 112 is an inverted ramp configuration to that of first portion 106 of non-removable seal 100. The volume and cross-sectional area of third portion 112 decreases along first path 118 in the direction of the arrow. Third portion 112 begins at first point 114 and is created along first path 118 until reaching first point 114 (see FIG. 10). Dispensing of the flowable elastomeric material ends when dispensing nozzle 102 reaches the second point 116 on the enclosure surface 104 for the second time. The first portion 106 of non-removable seal 100 and third portion 112 of non-removable seal 100 have a combined thickness, volume, and cross-sectional area that is substantially equal to the thickness, volume, and cross-sectional area of the second portion 110 of non-removable seal 100. One of skill in the art would also understand that the direction in which the second seal is dispensed may be reversed from that described in FIGS. 1A-1C.

The mirrored inclined geometry of third portion 112 may be created by dispensing the elastomer using one or more techniques that are the reverse of those used to create first portion 106. First, the dispensing nozzle may dispense elastomer at a constant flow rate, and move at an increasing rate along the first path 118, thereby steadily dispensing a decreasing volume of elastomer on the enclosure member surface 104. For example, the dispensing nozzle may be moving at a rate of about 20 mm/sec, and then increase in speed to about 50 mm/sec. Second, the dispensing nozzle may dispense elastomer at a decreasing flow rate as the dispensing nozzle moves along the first path 118, but maintain a constant rate of movement along the first path 118. Third, the rate of movement of the dispensing nozzle may increase along the first path 118 and the flow rate of elastomer from the dispensing nozzle 102 may decrease as the dispensing nozzle moves along the first path 118. Fourth, the distance of the dispensing nozzle from the enclosure member surface may be decreased as the dispensing nozzle dispenses seal-producing material and moves relative to the enclosure member surface.

When the dispensing nozzle moves away from the enclosure member surface, along an axis perpendicular to a plane of the enclosure member surface, the volume or cross-sectional area of seal-producing material being dispensed from the dispensing nozzle across a given length or distance is decreased. By overlapping the first portion 106 and the third portion 112 with complementary inclined or ramped geometries, the height of the seal at the first and second regions may be similar to or the same as that of the rest of the seal. In some embodiments, the combined thickness, volume, or cross-sectional area of first portion 114 and third portion 116 is within a certain percentage of the specified thickness, volume, or cross-sectional area of second portion 110. For example, the combined thickness, volume, or cross-sectional area of the first portion and third portion may be within 10% or less, 5% or less, 4% or less, 3% or less, 2% or less, or 1% or less of the specified thickness, volume, or cross-sectional area of the second portion.

Figure 1C:
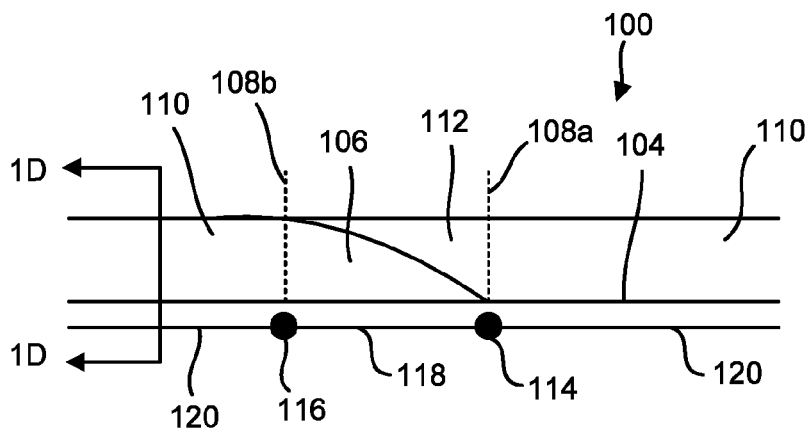
FIG. 1O shows a side view of the non-removable seal in FIGS. 1A and 1B that has been dispensed along first and second paths.
FIG. 1D is a sectional view of the dispensed non-removable seal in FIG. 1O.
FIG. 1E is a perspective view of the non-removable seal in FIG. 1O.
FIG. 1F shows a schematic diagram of the first and second paths and the geometry of the dispensed non-removable seal in FIGS. 1A-1E.
Figure 1D:
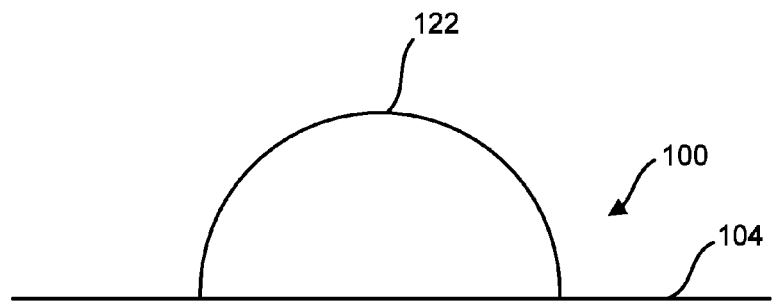
Figure 1E:
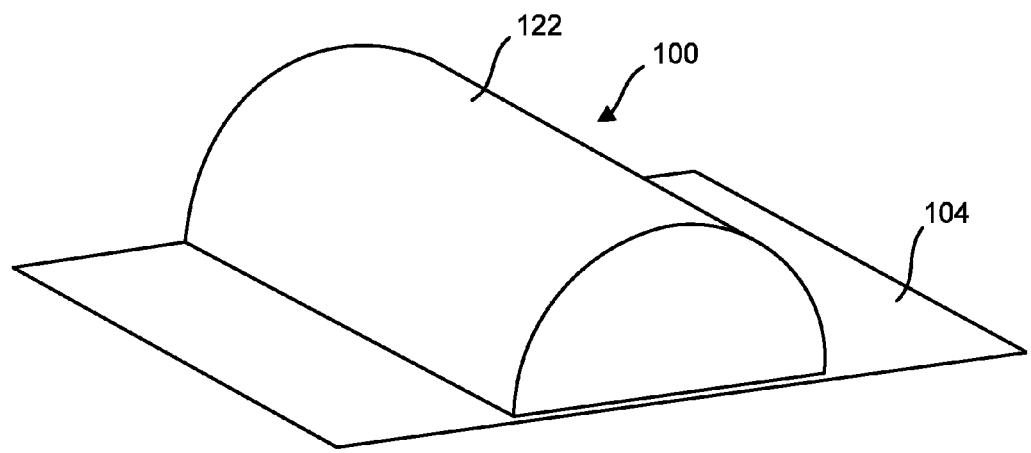
Figure 10:
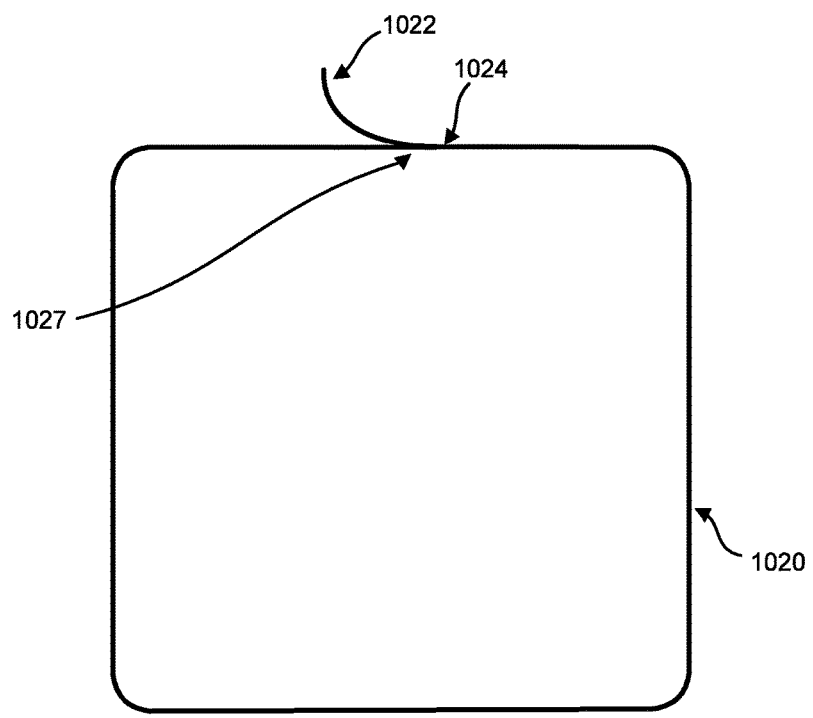
FIG. 10 illustrates an alternate embodiment of a dispensed seal.

FIG. 1D is a sectional view of FIG. 10, showing non-removable seal 100 on the enclosure member surface 104. Non-removable seal 100 has an apex 122 at which the height of the seal from enclosure surface is at its greatest relative to the enclosure surface. In this particular instance, the height of the apex may be measured using a vector that is perpendicular to the enclosure surface; the distance from where the vector begins to the highest point on the surface of the seal. This is because the cross-sectional geometry is substantially circular. When the cross-sectional geometry is non-circular, e.g. oval-shaped, the vector from the substantial center of the seal at the enclosure surface along the major axis to the surface of the seal is the height of the apex. The apex itself is where the vector intersects with the surface of the seal (or the secondary structure, discussed further below). When a second member of the enclosure (not shown) is secured on non-removable seal 100, a portion of the non-removable seal 100 proximate apex 122 contacts a sealing surface on the second member, to form a watertight barrier. The area of non-removable seal 100 that contacts the sealing surface may vary with the height of the seal, the curvature of the sides of the seal, and/or the elasticity of the elastomer that makes up the seal. FIG. 1E is a perspective view of a portion of the dispensed non-removable seal 100, illustrating non-removable seal 100 on enclosure member surface 104, and apex 122.

Figure 1F:
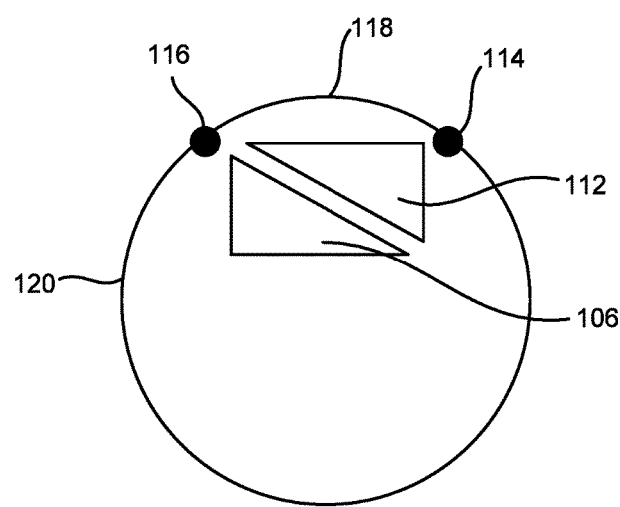

FIG. 1F is a schematic diagram that illustrates the first path 118 and the second path 120 taken by dispensing nozzle 102 as described above and shown in FIGS. 1A-1E. In between first point 114 and second point 116 are first portion 106 and third portion 112, positioned on first path 118. In the embodiment shown in FIGS. 1A-E and FIG. 2, the dispensed non-removable seal 100 and 200 forms a contiguous circuit that is a watertight barrier when positioned against a sealing surface on a second enclosure member.

Dispensed seals and secondary structures described herein may be formed from a flowable, elastomeric, seal-producing material that is polymerized and adhered to the inner surface of the enclosure or encasement member, such as a urethane polymer or a silicone polymer. The elastomer may self-adhere to the enclosure surface after it has been dispensed, or may be dispensed on an adhesive that is applied to the inner surface. In some embodiments, the elastomer extruded from the dispensing nozzle is capable of self-bonding, such that when the first portion and third portion of the seal overlay each other and polymerize, a watertight barrier is formed. While the elastomer may be self-adhering, in some embodiments, the first portion may be coated with a water-resistant or waterproof adhesive prior to dispensing the second portion, such that the first and third portions adhere to each other to form a watertight barrier.

After dispensing, the flowable elastomeric material on the first enclosure member may be treated to become a polymerized or cross-linked elastomeric seal, e.g. by curing. Curing will depend on the type of flowable material used. Curing may be accomplished by exposing or treating the flowable elastomeric material to heat, radiation (e.g. ultraviolet light, gamma rays, x-rays, accelerated electron beams), application of chemical additives, or a combination of multiple curing techniques. Heat-based methods of curing the flowable material may include radiation heating (e.g. using infrared radiation, lasers, or microwaves), convection heating, conduction heating (e.g. hot gas, flame, oven and hot shoe heating), induction heating, ultrasonic heating, resistance heating, and heating based on thermal additives (e.g. magnetic particles, near-infrared absorbent particles).

In some embodiments of the instant technology, the flowable elastomeric material used to form the seal may be a urethane polymer or a silicone polymer. The elastomeric material may be formed by mixing one or more additional co-reactants just prior to extrusion through the dispensing nozzle, and then self-cure once dispensed. For example, if the elastomer is formed from two co-reactants, the co-reactants are maintained in separate containers and then are mixed together and immediately dispensed onto the enclosure surface through the dispensing nozzle. The dispensed elastomer cures on the enclosure surface. The mixing may occur in the dispensing nozzle itself using a static mixer containing a helix, double-helix, or other baffle structure leading to sufficient turbulence for mixing. Additional curing techniques to speed the curing time of a dispensed self-curing elastomeric material may be utilized, including ultraviolet light, heat, chemicals, as well as sequential or simultaneous combinations of multiple curing techniques.

Adhesion of the seal-forming elastomeric material to the surface of the enclosure member is also desirable. An adhered seal on an enclosure or encasement member allows the encasement or enclosure to be opened and closed repeatedly, with minimal impact on the sealing ability of the encasement or enclosure. In some embodiments, enclosure or encasement members may be made from a plastic, making adhesion of a dispensed seal (e.g. a silicone-based or urethane-based material) more difficult than if the encasement is made from another material, such as steel. In such instances, it is desirable to treat or expose the surface of the enclosure member with ultraviolet radiation or ionizing energy (e.g. plasma or corona treatment, gamma radiation, electron beams) for a period of time, thus cleaning the surface and increasing the number of chemical functional groups available for binding on the surface of the enclosure. Such a treated surface may be better able to adhere to a dispensed seal. For example, the enclosure or encasement member surface to receive a flowable elastomeric seal-producing material may be treated for between about 1 second and about 30 seconds, between about 30 seconds and about 60 seconds, between about 1 minute and about 2 minutes, between about 2 minutes and about 5 minutes, or between about 5 minutes and about 10 minutes. In some instances, the radiant exposure of an enclosure or encasement surface may be between about 0.5 and about 2.0 joules/cm$^2$, between about 1.0 and about 1.5 joules/cm$^2$, or may be about 1.3 joules/cm$^2$.

Varying the distance of the dispensing nozzle from the surface while the dispensing nozzle moves around the encasement member can be another way of creating a ramped or inverted ramp portions of a seal. For example, having dispensing nozzle 102 close to enclosure member surface 104 at point 114 (see FIG. 1A) and then moving dispensing nozzle 102 farther away from enclosure member surface 104 as dispensing nozzle 102 moves laterally along first path 118 can result in a ramped or inclined portion, such as first portion 106. For example, the dispensing nozzle 102 may be touching enclosure member surface 104 prior to moving horizontally or laterally and dispensing material. In some instances, the dispensing nozzle 102 may be about 0.1 mm, about 0.2 mm, about 0.3 mm, about 0.4 mm, or about 0.5 mm above enclosure member surface 204 when dispensing is initiated. In certain instances, the dispensing nozzle 102 may be between about 0.05 mm and about 1 mm, between about 0.1 mm and about 0.5 mm, or between about 0.2 and about 0.3 mm above enclosure member surface 104 when dispensing is initiated.

As the dispensing nozzle moves laterally along the enclosure member surface 104 to dispense non-removable seal 100, the dispensing nozzle may move away from enclosure member surface 104 until an upper distance is reached. In some instances, the dispensing nozzle may move from 0 mm to about 10 mm away from the enclosure surface, from 0 mm to about 5 mm from the enclosure surface, from 0 mm to about 2 mm from the enclosure surface, from about 0 mm to about 1 mm from the enclosure surface, or from about 0 mm to about 0.5 mm from the enclosure surface. In certain instances, the dispensing nozzle may move from a distance of about 0.25 mm to about 10 mm from the enclosure surface, from 0.25 mm to about 5 mm from the enclosure surface, from 0.25 mm to about 2 mm from the enclosure surface, from about 0.25 mm to about 1 mm from the enclosure surface, or from about 0.25 mm to about 0.5 mm from the enclosure surface.

The movement of the dispensing nozzle vertically away from the surface of an enclosure or encasement member from one height to another may occur over a certain lateral or horizontal distance, in order to control the slope of the ramped portion. For example, the change in vertical distance of the dispensing nozzle may occur over a lateral or horizontal distance of about 0.5 mm, about 1 mm, about 1.5 mm, about 2 mm, about 2.5 mm, about 3 mm, about 3.5 mm, about 4 mm, about 4.5 mm, about 5 mm, about 7.5 mm, or about 10 mm.

Similarly, an inverted ramp or declined portion of a seal may be formed by moving dispensing nozzle 102 closer to first portion 106 as dispensing nozzle 102 moves along first path 118 to complete the seal (see FIG. 10). For example, the dispensing nozzle may move vertically downward, from a height at which a non-removable seal 100 is being dispensed towards a first portion 106 as dispensing nozzle 102 moves horizontally along first path 118, resulting in a reverse ramped or declined portion, such as third portion 112. For example, the dispensing nozzle 102 may move from a certain height laterally downward towards a ramped or inclined portion of seal about 1 mm, about 0.75 mm, about 0.5 mm, about 0.4 mm, about 0.3 mm, about 0.2 mm, or about 0.1 mm.

As the dispensing nozzle moves vertically downward towards a seal portion or segment, the movement of the dispensing nozzle may occur over a certain horizontal or lateral distance, in order to control the slope of the ramped portion. For example, the change in vertical distance of the dispensing nozzle may occur over a lateral or horizontal distance of about 0.5 mm, about 1 mm, about 1.5 mm, about 2 mm, about 2.5 mm, about 3 mm, about 3.5 mm, about 4 mm, about 4.5 mm, about 5 mm, about 7.5 mm, or about 10 mm.

In certain embodiments, a declined or inverted ramped portion of a seal may be dispensed by stopping material from being dispensed before the dispensing nozzle has finished moving laterally or horizontally along the surface of an enclosure or encasement member. This allows elastomeric material already extruded from the dispensing nozzle to be extended across an inclined or ramped portion of seal and form a tapered portion that has a declined, or inverted ramp configuration. For example, dispensing or extrusion of flowable elastomeric material from the dispensing nozzle may end when the dispensing nozzle is within about 10 mm, about 7.5 mm, about 5 mm, about 4 mm, about 3 mm, about 2 mm, about 1 mm, about 0.5 mm, or about 0.25 mm horizontal distance from a first point on the enclosure surface.

Depending on the viscosity of the flowable elastomeric material being dispensed, a small tail of material may still be created that is attached to the dispensing nozzle and not yet contacting the seal. In order to separate the tail from the dispensing nozzle, the dispensing nozzle may continue to move laterally or horizontally along the enclosure surface, and then move in a reverse direction. This creates sufficient forces to separate the tail from the dispensing nozzle. For example, the dispensing nozzle may additionally move laterally or horizontally about 1 mm to about 5 mm, about 5 mm to about 10 mm, about 10 mm to about 15 mm, about 15 mm to about 25 mm. In some embodiments, the dispensing nozzle may also move upwards away from the enclosure surface an additional distance as it moving laterally. For example, the dispensing may move away from the enclosure surface an additional distance of between about 0.1 mm and about 0.25 mm, between about 0.25 mm and about 0.5 mm, between about 0.5 mm and about 1 mm, between about 1 mm and about 1.5 mm, between about 1.5 mm and about 2 mm, between about 2 mm and about 2.5 mm, between about 2.5 mm and about 5 mm, or between about 5 mm and about 10 mm. The dispensing nozzle then moves laterally or horizontally in the reverse direction about 1 mm to about 5 mm, about 5 mm to about 10 mm, about 10 mm to about 15 mm, about 15 mm to about 25 mm, in order to ensure that the tail is separated from the dispensing nozzle.

Figure 2A:
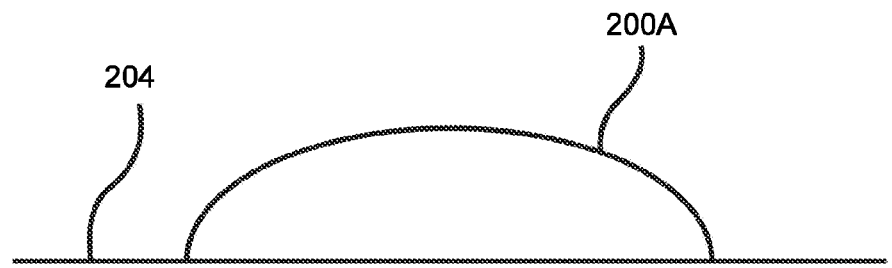
FIG. 2A shows a side sectional view of a flattened dispensed non-removable seal.
Figure 2B:
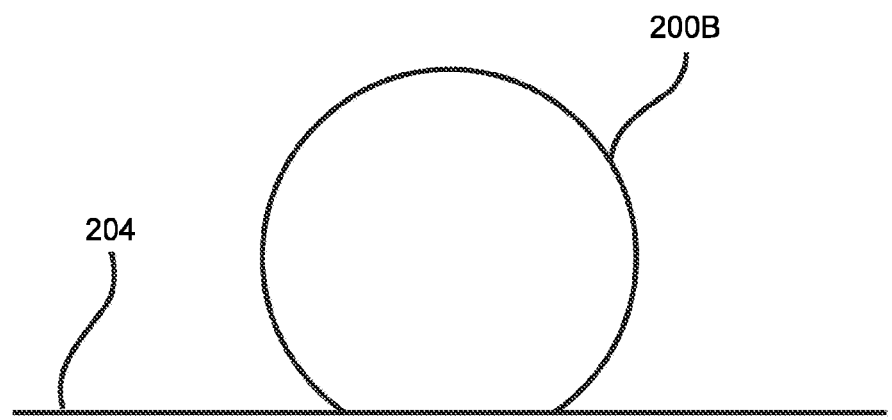
FIG. 2B shows a side sectional view of a rounded dispensed non-removable seal.
Figure 2C:
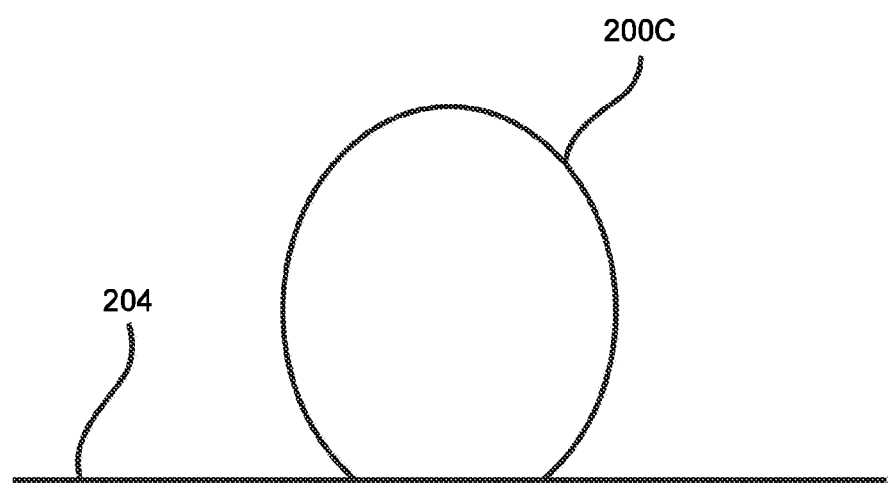
FIG. 2C is a side sectional view of an oval-shaped dispensed non-removable seal.

FIGS. 2A-2C illustrate sectional views of beads of material dispensed by a dispensing nozzle at different heights as described above and shown in FIGS. 1A-1C. In each view of the dispensed seal, the height of the dispensing nozzle (not shown) relative to the enclosure or encasement member surface 204 has been varied. For example, dispensed non-removable seal 200A shown in FIG. 2A has a flattened, oval-shaped profile relative to enclosure member surface 204 of an encasement or enclosure member on which it was dispensed, with the longer axis of the oval being substantially parallel to enclosure member surface 204. Such a flattened or shallow sectional profile is achieved by keeping the dispensing nozzle close to enclosure member surface 204 while extruding the non-removable seal, with the dispensing nozzle essentially smearing the non-removable seal against enclosure member surface 204 as it comes out of the dispensing nozzle. In some instances, the dispensing nozzle may be touching enclosure member surface 204. The dispensing nozzle may be about 0.1 mm, about 0.2 mm, about 0.3 mm, about 0.4 mm, or about 0.5 mm above enclosure member surface 204 when dispensing is initiated. In certain instances, the dispensing nozzle may be between about 0.05 mm and about 1 mm, between about 0.1 mm and about 0.5 mm, or between about 0.2 and about 0.3 mm above enclosure member surface 204 when dispensing is initiated. By raising the dispensing nozzle from enclosure member surface 204 and dispensing the same material, a different shape can be achieved. For example, FIG. 2B shows a sectional view of a dispensed non-removable seal 200B on enclosure member surface 204, with the sectional shape of dispensed non-removable seal 200B being substantially circular. Raising the dispensing nozzle an even greater distance from enclosure member surface 204 while dispensing the material can result in an oval-shaped sectional profile. For example, FIG. 2C illustrates a dispensed non-removable seal 200C that can be created when the dispensing nozzle is an even greater distance from enclosure member surface 204. The major axis of the oval-shaped sectional profile has a major axis that is substantially perpendicular to enclosure member surface 204. The viscosity of the material being dispensed can affect the ability of non-removable seal to form sectional bead profiles that vary with dispensing nozzle height; too low of a viscosity and the non-removable seal will not be able to maintain its shape after being dispensed, while too high of a viscosity will limit the non-removable seal to the shape of the dispensing nozzle from which it emerges.

Figure 2D:
FIG. 2D is a view of a dispensed non-removable seal from above.
Figure 2E:
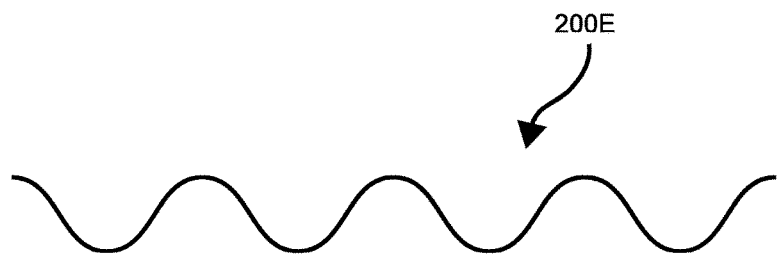
FIG. 2E is a view of another dispensed non-removable seal from above.

Raising the height of the dispensing nozzle relative to the case surface beyond a certain point may result in the actual path of the extruded elastomer not following the path traveled by the dispensing nozzle. In such instances, the path of the extruded elastomer may result in a curved oscillating path that deviates from the dispensing nozzle path in a wave-like pattern. For example, FIG. 2D shows an overhead view of a dispensed non-removable seal 200D dispensed in a straight line, by a dispensing nozzle that was moving in a straight line, and was close enough to the surface receiving the bead to dispense a straight bead. FIG. 2E also shows an overhead view of a dispensed non-removable seal 200E dispensed by a dispensing nozzle moving in a straight line; however, the dispensing nozzle was enough of a distance from the surface receiving the bead to result in a bead with a wave-like path. In addition, the dispensing nozzle height that produces a curved oscillating seal deviating from the dispensing nozzle path may vary, depending on the volume of elastomer dispensed from the nozzle. If the desired path of the dispensed seal is highly constrained and cannot deviate substantially from the dispensing nozzle path (such as in a channel or a perimeter portion about 1-5 mm wide), then path deviation of the dispensed seal due to excess height of the dispensing nozzle is detrimental to the ability of the dispensed seal to seal properly.

In one example, material dispensed from a 14-gauge needle tip may form a non-removable seal about 1.8 mm tall moving at a speed of about 20 mm/sec, and flowing material at a rate of 5.5 mL/min. For such parameter, an optimal distance between the dispensing nozzle and the surface receiving the bead may be between about 2.5 mm and about 4 mm. With a dispensing nozzle height above about 4 mm, the path of the non-removable seal begins to deviate from the path traveled by the dispensing nozzle. With a dispensing nozzle height below about 2.5 mm, the width of the cross-sectional profile of the bead is wider, and the height of the dispensed bead is lower, although the reduced height of the dispensed bead may be desirable when forming ramped or inclined portions of the bead.

Figure 3A:
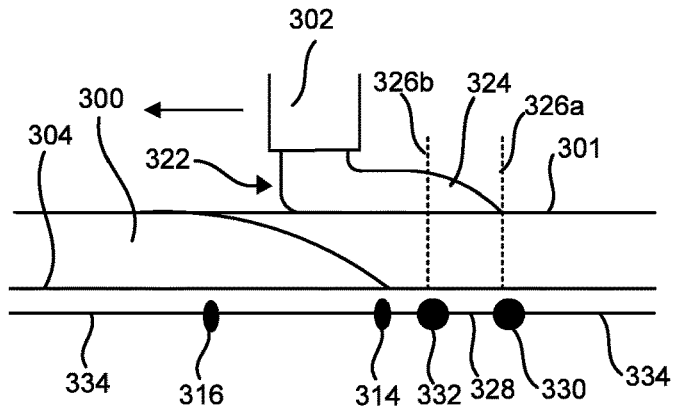
FIG. 3A shows a side view of a portion of a secondary structure dispensed on a surface of the non-removable seal of FIG. 1O along a third path and partially dispensed along a fourth path.
Figure 3B:
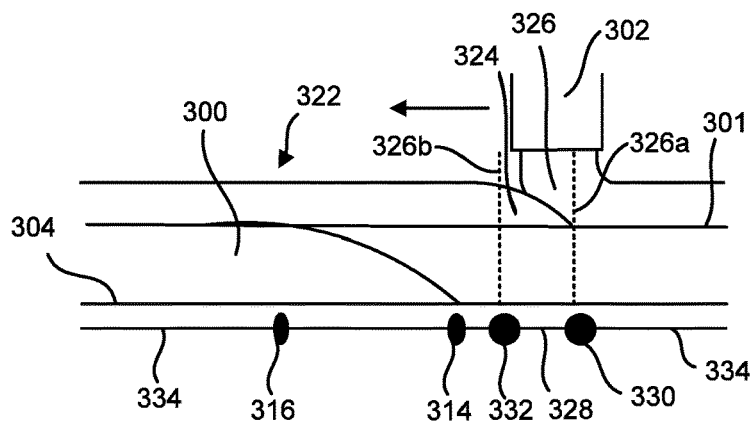
FIG. 3B shows a side view of the secondary structure portion of FIG. 3A partially dispensed on top of itself.
Figure 3C:
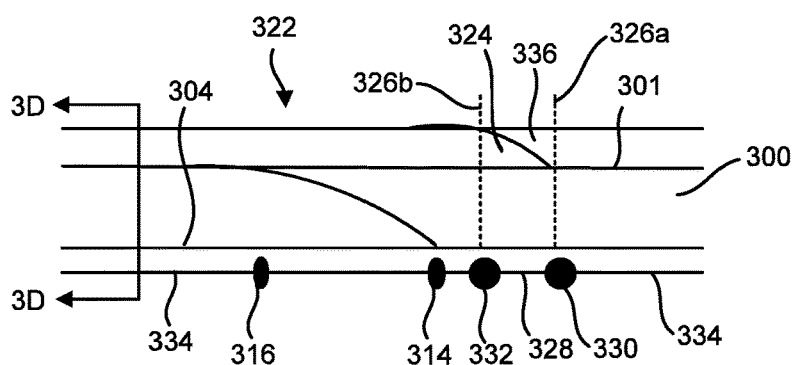
FIG. 3C shows a side view of the secondary structure portion in FIGS. 3A-B dispensed on the surface of the non-removable seal.

In certain embodiments, one or more secondary structures may be dispensed onto a seal on an enclosure surface, such as a dispensed non-removable seal as described herein. Such secondary structures may increase the available surface area on the seal for contacting a rigid sealing surface, or may create an additional barrier to prevent particulate matter from reaching the area between the seal or gasket and the sealing surface. Such secondary structures may or may not be watertight. For example, FIGS. 3A-3C show a side view of a secondary structure 322 being dispensed onto a previously dispensed non-removable seal 300. The elastomer of the secondary structure may be the same as or different from that of the seal on which the secondary structure is dispensed. As described above, the elastomer of the secondary structure may be self-bonding, or it may be coated with a waterproof or water-resistant coating to allow self-bonding. The elastomer may be formed from co-reactants mixed just prior to dispensing, or may be cured using heat, radiation, or chemical methods (as described above).

Similar to the dispensed seals described herein, dispensed secondary structures added to a seal (or directly to an enclosure member) may have three portions, segments, or lengths: a first length having a ramped configuration; a second length with a substantially constant thickness, volume, and cross-sectional area along its length; and a third length that overlays the first length and has an inverted ramp configuration. The combined thickness, volume, and cross-sectional area of the first and third lengths are substantially equal to the thickness, volume, and cross-sectional area of the second length so as to minimize the presence of peaks or valleys where the first and third lengths of seal meet.

For example, FIG. 3A shows a side view of an exemplary secondary structure 322 that has started being dispensed by a dispensing nozzle 302 along an outer surface 301 of a non-removable seal 300. The arrow shows the direction of movement of dispensing nozzle 302 as the elastomer is being dispensed. On the schematic line below non-removable seal 300, first point 314 and second point 316 are indicated where non-removable seal 300 was dispensed on enclosure member surface 304 using similar techniques to those described above for FIGS. 1A-1E. A first portion 324 of the secondary structure 322 is inclined relative to outer surface 301 of non-removable seal 300, and is demarcated by dotted lines 326a and 326b. The volume of first portion 324 increases along third path 328 in the direction of the arrow. The third portion begins at a third point 330 and is created along third path 328 until reaching a fourth point 332 (see, e.g. FIG. 3C). After dispensing nozzle 302 reaches the third point 330, the dispensing nozzle follows the fourth path 334. The third point 330, fourth point 332, third path 328 and fourth path 334 are indicated in the schematic line underneath the non-removable seal 300. In the embodiment depicted in FIGS. 3A-3C, the third and fourth paths of the secondary structure 322 overlap with the paths followed by non-removable seal 300 that was previously dispensed. As with the dispensed seal described above, the third portion's inclined geometry may be created by: decreasing the rate of movement of dispensing nozzle 302 along the third path (while keeping the flow rate constant); dispensing an increasing volume of elastomer on the seal surface by increasing the flow rate (while keeping the dispensing nozzle's rate of movement constant); or changing both the rate of dispensing nozzle movement and the extrusion rate of the elastomer from the dispensing nozzle.

FIG. 3B shows a side view of secondary structure 322 being dispensed on non-removable seal 300 as the dispensing nozzle 302 completes the circuit of the fourth path 334 along non-removable seal 300 and starting to recapitulate its movement along the third path 328. Secondary structure 322 includes a second portion or segment 336 that is also formed along the third path 328 on the surface of the first portion in an inclined geometry that mirrors the inclined geometry of first portion 324. The volume of second portion 336 decreases along third path 328 in the direction of arrow. Second portion 336 begins at third point 330 and is created along third path 328 until reaching fourth point 332 (see, e.g., FIG. 3C). As described above, the third portion's inclined geometry may be created by: increasing the dispensing nozzle's rate of movement along the third path (while keeping the flow rate constant); dispensing a decreasing volume of elastomer on the seal surface by decreasing the flow rate (while keeping the dispensing nozzle's rate of movement constant); or changing both the rate of dispensing nozzle movement and the extrusion rate of the elastomer from the dispensing nozzle.

Figure 3D:
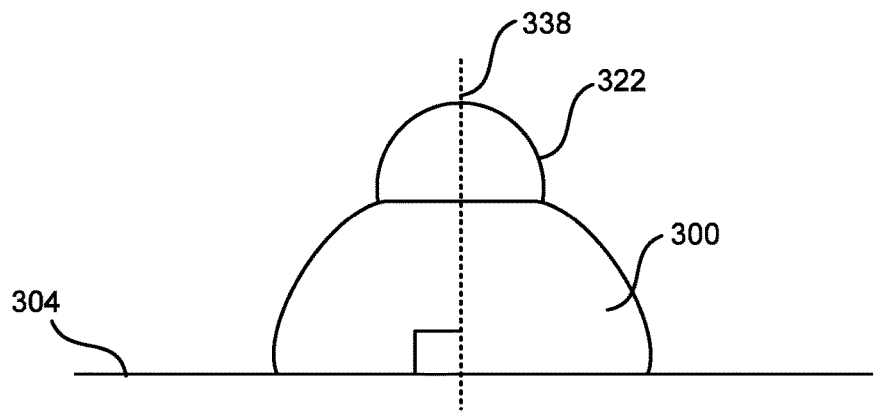
FIG. 3D is a sectional view of a portion of the non-removable seal and secondary structure in FIG. 3C.
Figure 3E:
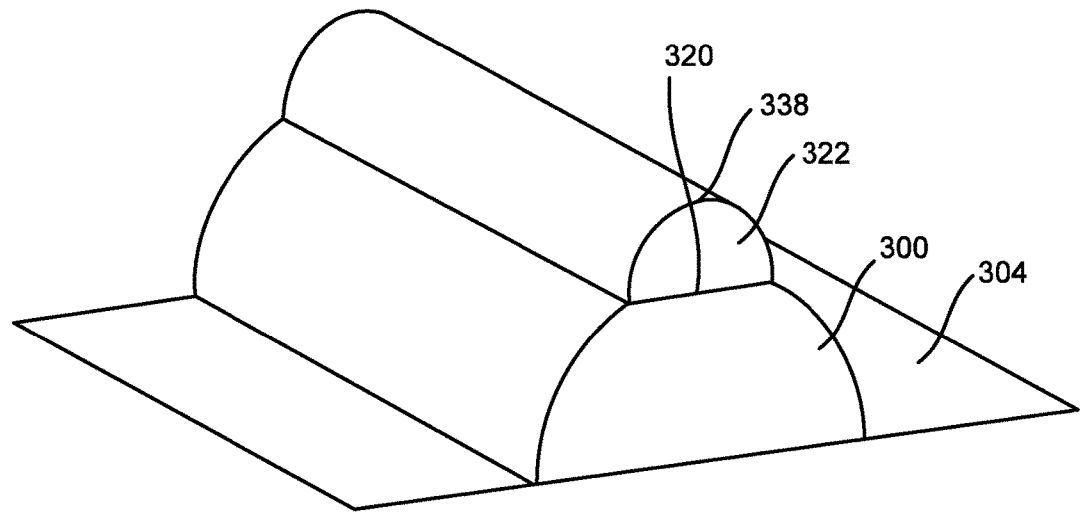
FIG. 3E is a perspective view of a portion of the non-removable seal and secondary structure in FIG. 3C.

FIG. 3D is a sectional view of section 3D of FIG. 3C, showing non-removable seal 300 and associated secondary structure 322. In the embodiment depicted, secondary structure 322 is positioned over apex 320 of non-removable seal 300. When a second enclosure member (not shown) is secured to the first enclosure member, at least a portion of secondary structure 322 and/or non-removable seal 300 contacts a sealing surface on the second member of the enclosure to form a watertight barrier. FIG. 3E is a perspective view of a portion of non-removable seal 300 and associated secondary structure 322.

Figure 4A:
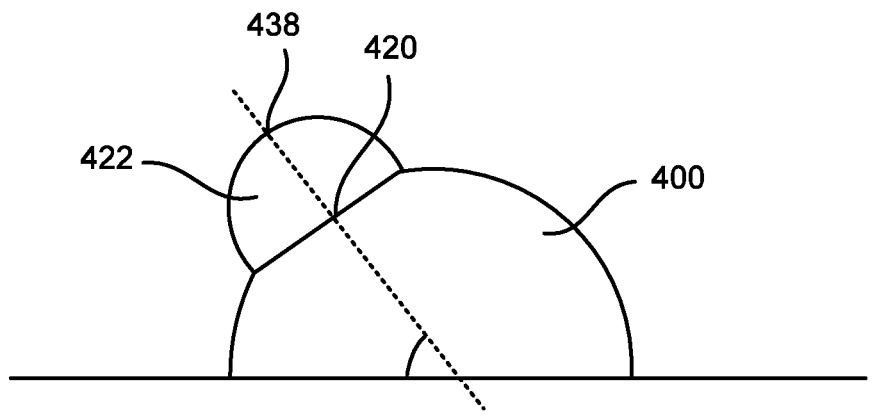
FIGS. 4A-B are sectional views of embodiments of a non-removable seal having a secondary structure offset from the apex of the seal.
Figure 4B:
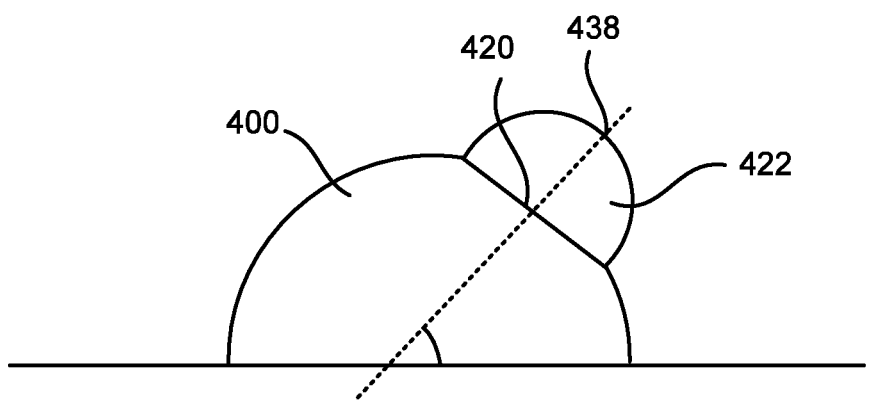

Secondary structure 322 of FIG. 3D also has an apex 338. In the embodiment shown in FIG. 3D, apex 320 of non-removable seal 300 and apex 338 of secondary structure 322 align vertically (indicated by the dotted line) to form about a 90 degree angle relative to enclosure member surface 304. In other embodiments, a secondary structure may be angled or canted relative to the apex of the seal. In other words, the apex of the secondary structure and the apex of the seal align at an angle relative to the enclosure member surface. For example, FIG. 4A illustrates a side view of a secondary structure 422 dispensed on a non-removable seal 400 such that seal surface 420 and apex 438 align at less than a 90-degree angle to the left side of non-removable seal 400. FIG. 4B illustrates a secondary structure 422 dispensed on a non-removable seal 400 such that seal surface 420 and apex 438 align at less than a 90-degree angle toward the right side of non-removable seal 400. In some embodiments of a seal having a secondary structure, the apex of the secondary structure and the apex of the seal may align at an angle of about 90 degrees relative to the enclosure member surface. In some embodiments, the apex of the secondary structure and the apex of the seal may align at an angle of less than about 90 degrees relative to the enclosure member surface, including angles less than about: 80 degrees; 70 degrees; 60 degrees; 50 degrees; 40 degrees; 30 degrees; 20 degrees; and 10 degrees. In some embodiments, the apex of the secondary structure and the apex of the seal may align at an angle of about 45 degrees relative to the enclosure member surface.

In some embodiments, a secondary structure may be dispensed on a molded seal that is not dispensed on an enclosure surface, but is instead adhered to or molded directly to the enclosure member surface. In such instances, the dispensing nozzle may follow a first path from a first point to a second point while creating an inclined first portion, follow a second path from the second point back to the first point, and then follow the first path from the first point to the second point while creating a mirrored inclined second portion.

In the embodiment shown in FIGS. 3A-C, the third point and fourth point are different from the first and second points. However, in some embodiments, the third point or the fourth point may overlap with either the first point or the second point (or a combination of both), such that the third portion and fourth portion of the secondary structure 322 partially or completely overlap with the first and second portions of non-removable seal 300.

In some embodiments of the present technology, a contiguous seal may be formed using multiple passes of dispensing and multiple seal members. Forming a contiguous seal may be required by the geometry of the particular case, such as an overhang that may block movement of the dispensing nozzle, a surface that moves from one plane to another, or seals for separate compartments of an encasement that need to intersect. For example, a first seal member may be formed by dispensing a first bead having an inclined or ramped first portion at one end and a declined or inverted ramp second portion at a second end. In such an embodiment, the first and second portions of the first seal member are not joined together. Then, a second pass may be made by the dispensing nozzle of the robotic dispenser, starting from the paths followed by either the first or the second portion, and creating a second seal member that overlays and bonds with the first and second portions of the first seal member to ensure a watertight seal at the junctures.

In some embodiments, a seal may be formed from six portions, segments, or lengths. In such instances, two pairs of seal portions overlap each other to create a combined thickness, volume, or cross-sectional area that is substantially equal to the thickness, volume, or cross-sectional area of the other lengths of seal (see, e.g. FIGS. 5A-5E and description of dispensing below). For example, a seal may include a first portion having a ramped configuration from a first point to a second point on a surface of an enclosure or encasement member, a second portion from the second point to a third point, and a third portion having a ramped structure that decreases in thickness, volume, and cross-sectional area from the third point to a fourth point. The second portion may have a thickness, volume, and cross-sectional area that is substantially constant along its length between the second and third points. A fourth length of seal may overlay the third portion of seal and have an inverted ramp configuration such that the seal between the third and fourth points have a combined thickness, volume, and cross-sectional area substantially equal to the thickness, volume, and cross-sectional area of the second portion. A fifth portion of seal may extend between the fourth point and the first point and have a thickness, volume, and cross-sectional area that is substantially constant along its length. The thickness, volume, and cross-sectional area of the fifth portion may be substantially equal to that of the second portion. However, in certain embodiments, the thickness, volume, and cross-sectional area of the fifth portion and the second portion may not be the same. This may be necessary if one portion of the sealing surface on the corresponding encasement or enclosure member protrudes a greater or lesser distance from the member than other portions of the sealing surface. Finally, the seal may include a sixth portion that overlays the first portion and has an inverted ramp configuration, such that the two portions have a combined thickness, volume, and cross-sectional area substantially equal to the thickness of the second portion of seal.

Figure 5A:
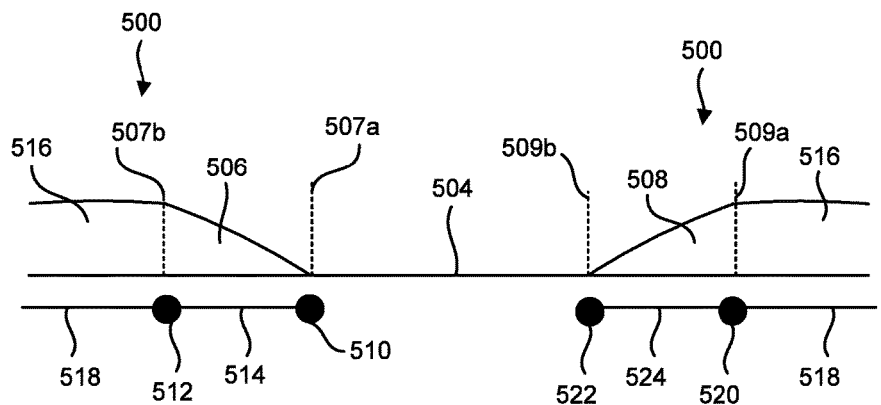
FIG. 5A shows a side view of two end portions of a first seal member.

For example, FIG. 5A provides a side view of a first seal member 500 dispensed in a manner similar to that described above for dispensing a contiguous seal, except that first seal member 500 includes a first end portion 506 and a second end portion or segment 508 positioned apart from one another on enclosure member surface 504 of an enclosure member. First end portion or segment 506 is dispensed from first point 510 to second point 512 along first path 514, and is positioned between dotted lines 507a and 507b. Middle portion or segment 516 is dispensed along second path 518 between second point 512 and third point 520. Second end portion 508 is then dispensed between third point 520 and fourth point 522 along third path 524 (between dotted lines 509a and 509b).

Figure 5B:
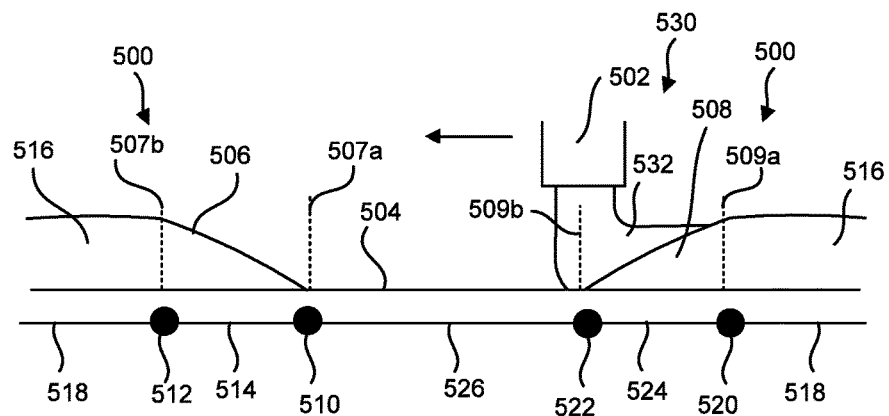
FIG. 5B shows a side view of a portion of a second seal member being dispensed onto a first end of a first seal member on an enclosure member surface.
Figure 5C:
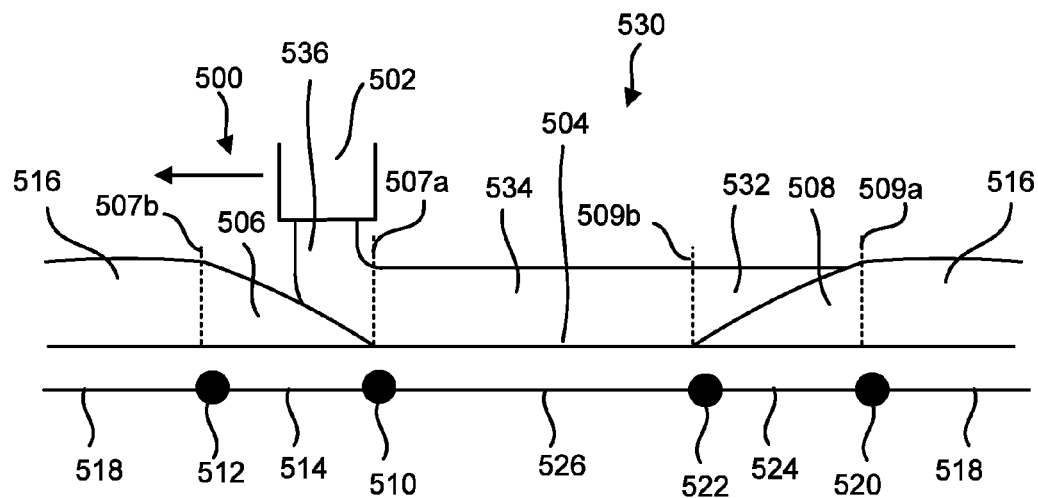
FIG. 5C shows a side view of a dispensed second seal member on first and second portions of the first seal member in FIGS. 5A-B.
Figure 5D:
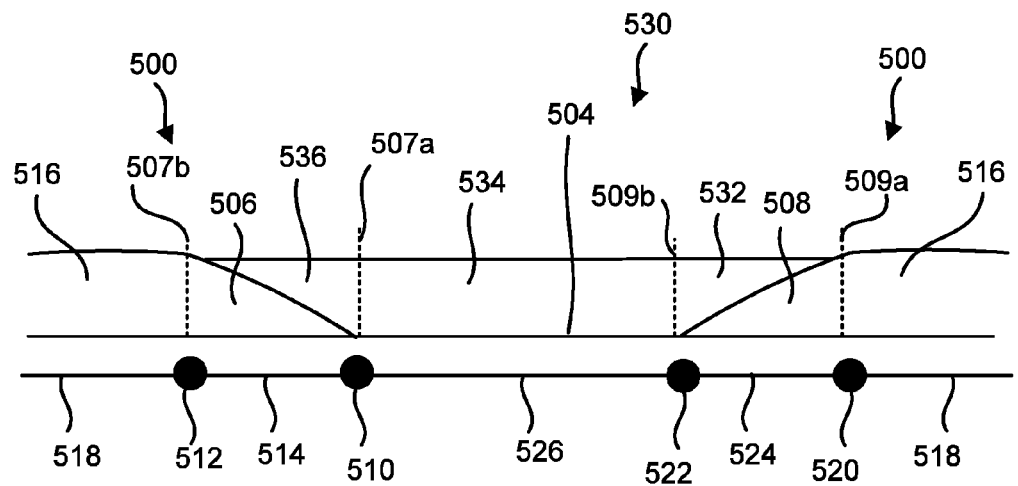
FIG. 5D shows a side view of the completed second seal member of FIG. 5C.

FIGS. 5B-D provide views of an embodiment of a second seal member 530 being formed on first seal member 500. FIG. 5B shows a dispensing nozzle 502 moving to the left along third path 524. In FIG. 5B, second seal member 530 is being dispensed along third path 524 between third point 520 and fourth point 522, forming a first filling portion or segment 532 of second seal member 530 (see schematic line underneath first seal member 500). Dotted lines 533a and 533b demarcate the edges of first filling portion 532. First filling portion 532 has an inclined geometry relative to that of the first end portion 506 of first seal member 500. As described herein, the inclined geometry of first filling portion 532 may be formed by decelerating the dispensing nozzle's rate of movement as it moves along first path 514 (maintaining a constant flow rate of elastomer), increasing the flow rate as the dispensing nozzle moves along first path 514 (maintaining a constant rate of movement), or a combination of multiple techniques.

FIG. 5C shows a side view of second seal member 530 while it is being dispensed on first end portion 506. Dispensing nozzle 502 has dispensed second filling portion or segment 534 of second seal member 530 along fourth path 526 between fourth point 522 and first point 510. Third filling portion 536 is being dispensed from first point 510 to second point 512 along first path 514, via dispensing nozzle 502. The inclined geometry of third filling portion 536 may be formed using one of the techniques described above: accelerating the dispensing nozzle's rate of movement as it moves along first path 514 (maintaining a constant flow rate of elastomer), decreasing the flow rate as the dispensing nozzle moves along the first path 514 (maintaining a constant rate of movement), or a combination of both techniques.

FIG. 5D illustrates a side view of a completed second seal member filling the gap or space in between first end portion 506 and second end portion 508 of first seal member 500. In some embodiments, the second seal member may fill a gap between a first end portion of one bead and a second end portion of another bead. In some embodiments, the combined thickness, volume, and cross-sectional area of at least one of the overlapping combinations of first end portion 506 and third filling portion 536, and second end portion 508 and first filling portion 532 is within a certain percentage of the specified thickness of second filling portion 534. For example, the combined thickness of the overlapping portions may be 10% or less, 5% or less, 4% or less, 3% or less, 2% or less, or 1% or less of the specified thickness, volume, and cross-sectional area of the second filling portion.

In some embodiments, secondary structures dispensed on seals or enclosures as described above may also be dispensed using six portions, as described above. Dispensed secondary structures may have multiple pairs of seal portions that overlap with ramped and inverted ramp configurations, thereby having a combined thickness, volume, or cross-sectional area that is substantially equal to that of another portion, or combination of portions.

In certain embodiments, the first seal member and the second seal member may be formed from the same elastomer or a different elastomer. In some embodiments, the second seal member may self-bond with the first seal member. The first seal member may be coated (e.g. by spraying) with a water-resistant adhesive to allow the second seal member to form a watertight bond with the surface of the first seal member. In some embodiments, one or more secondary structures as described above may also be dispensed on at least one of the first seal member and the second seal member. One of skill in the art would also understand that the direction in which the second seal is dispensed may be reversed from that described in FIGS. 5A-5C.

In some instances, it may desirable to dispense seals that are narrow but also having a thickness, or height from the enclosure member surface, that is larger than can be achieved from dispensing the uncured seal material. Depending on the surface tension of the uncured seal material and the surface energy on the enclosure member to receive the seal, the thickness and width of seal may be constrained. In order to achieve a dispensed seal or secondary structure that has a thickness greater than what is possible from being dispensed, or a width that is narrower than what is possible from a dispensed seal or secondary structure, the enclosure member surface may be inverted following dispensing of the seal. Gravity can then pull downwards on the liquid seal or secondary structure, increasing the thickness and/or the width of the seal or secondary structure as the liquid is drawn towards the earth. Thus the geometry of the seal or secondary structure may be changed without increasing its volume. In some embodiments, an enclosure member may be spun in a circle with the seal and/or secondary structure facing outward, e.g. by a centrifuge, thereby exerting outward force on seal or secondary structure and increasing the thickness and/or the width of the seal or secondary structure. The angle at which the enclosure member is held or spun may also be changed, such that the apex of the seal or secondary structure may be asymmetrically shifted or canted to one side. After the geometry of the seal or secondary structure has been changed, the dispensed seal or secondary structure may be cured to fix the geometry of the seal and/or secondary structure. In some embodiments, the enclosure or encasement surface may not be oriented substantially perpendicular to the dispensing nozzle. This can also allow canting or shifting of the apex of the non-removable seal relative to the plane of the enclosure or encasement surface.

Figure 6:
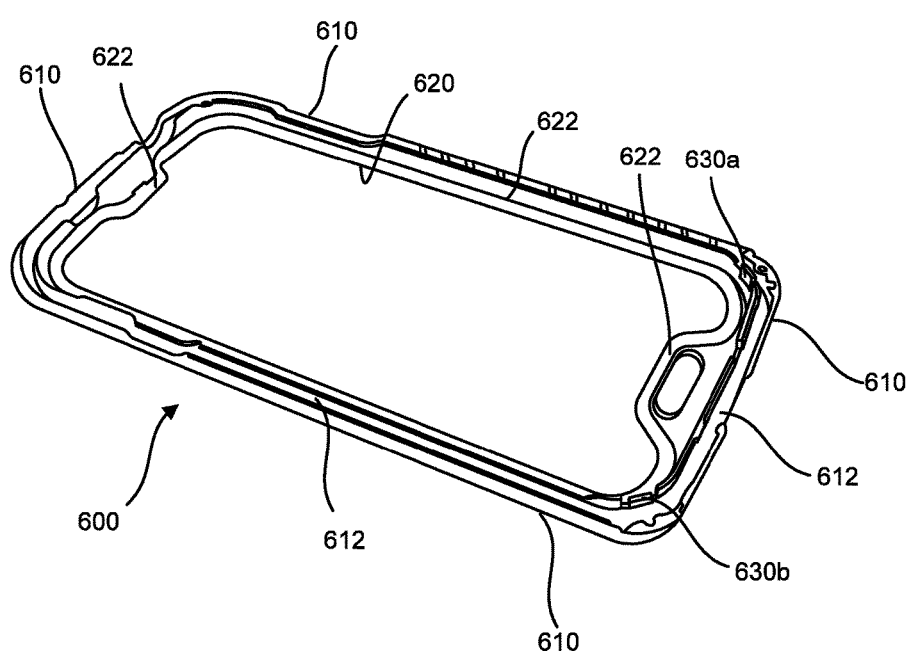
FIG. 6 is a perspective view of a top member of an enclosure that includes a first dispensed seal on an inside edge that can frame and seal against the touchscreen display of an enclosed electronic device, as well as a second dispensed seal that compresses against a portion of a bottom member.

FIG. 6 shows a perspective view of the inner surface of an exemplary top enclosure or encasement member 600 for an enclosure. Top enclosure member 600 includes clasping features 630a and 630b for removably clasping with corresponding clasping elements on a corresponding bottom member (not shown). Top enclosure member 600 has a perimeter portion 610 that includes a dispensed first non-removable seal 612 positioned on the inner surface of perimeter portion 610. A frame portion 620 is also shown, and is configured to frame a display of an enclosed electronic device. The inner surface of frame portion 620 also includes a second dispensed seal 622. When top member 600 is assembled with a bottom member to enclose an electronic device, the dispensed second non-removable seal 622 on frame portion 620 seals against a region of the electronic device proximate the display. While top member 600 is depicted as having a first seal on the perimeter portion and a second seal on the frame portion, other configurations are possible. For instance, the top member may have a frame portion and an associated seal, with no seal on the perimeter portion, while the bottom member includes a seal on a perimeter portion. In some embodiments, both the top and bottom members may include frame portions and associated seals, with the frame portion on the top member framing an electronic device display and the frame portion on the bottom member framing an area on the rear housing or a second display. In such embodiments, a seal may also be positioned on the perimeter portion of at least one of the top member and the bottom member. In some embodiments, the two members of the enclosure may fit over proximal and distal ends of the electronic device, and a dispensed seal may be positioned on one or more of the mating surfaces of the enclosure members. Exemplary enclosures using members that fit over ends of the electronic device may be found in U.S. Pat. Pub. No. 2014/0152890, the entire contents of which is incorporated by reference in its entirety.

Figure 7A:
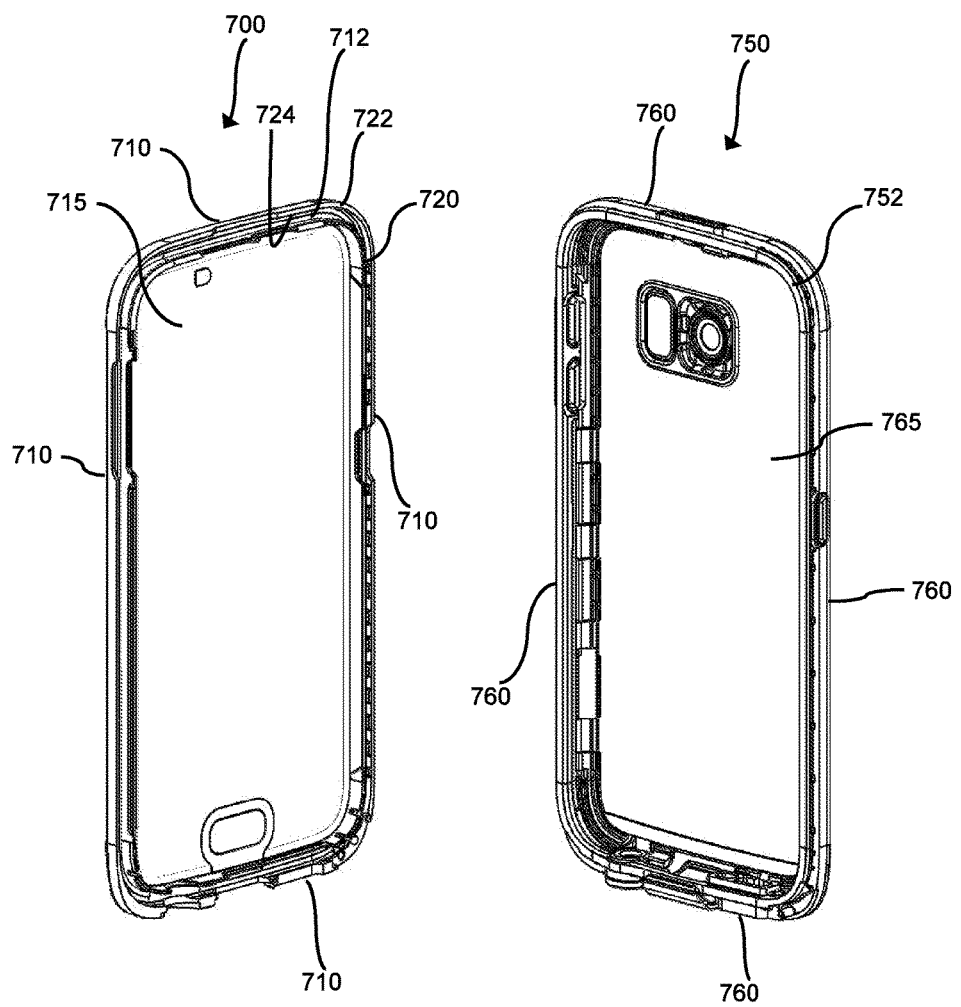
FIG. 7A is a perspective view of the inner surfaces of two members of a protective enclosure embodiment.

FIG. 7A shows an embodiment of an enclosure or encasement having a top member 700 and a bottom member 750 that clasp together to encase or enclose an electronic device (not shown). Top member 700 has an inner surface 715 that is not exposed when coupled or clasped with bottom member 750. The front surface of the electronic device that is enclosed by top member 700 and bottom member 750 includes a touch-sensitive display. In this embodiment, inner surface 715 of top member 700 is formed in part from a transparent membrane that overlays the electronic device display and allows the electronic device display to be viewed and accessed. Top member 700 has a perimeter portion 710 with a channel 724 defined by an inner wall 720 and an outer wall 722. Channel 724 includes a non-removable seal 712 dispensed or extruded by the methods disclosed herein. Bottom member 750 also has an inner surface 765 that touches the back surface of an installed electronic device. Perimeter portion 760 of bottom member 750 corresponds with perimeter portion 710 of top member 700. A wall 752 configured to at least partially enter channel 724 extends from perimeter portion 760. Clasp features on the inner wall 720 and outer wall 722 of top member 700, and wall 752 of bottom member 750 are shown in more detail in FIG. 7B. The clasp features removably interact in order to clasp and maintain top member 700 and bottom member 750 together and compress non-removable seal 712, creating a waterproof barrier between the top and bottom members.

Figure 7B:
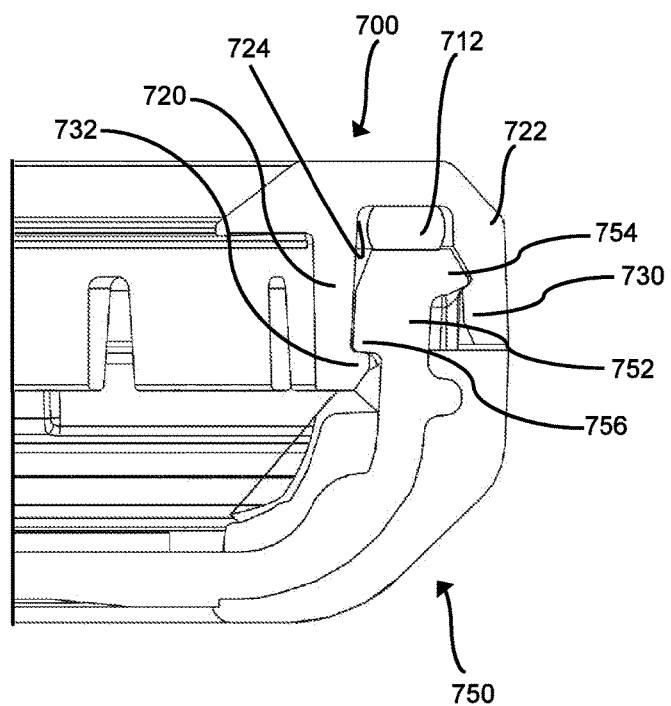
FIG. 7B is a partial side sectional view of the two members of FIG. 7A clasped together, showing a channel and gasket in the top member and a wall in the bottom member.

FIG. 7B illustrates a side sectional view of top member 700 and bottom member 750 while clasped together, without an electronic device. Channel 724 of top member 700 is defined by inner wall 720 and outer wall 722. Non-removable seal 712, dispensed on channel 724 is partially compressed by wall 752 of bottom member 750. In some embodiments, non-removable seal 712 may be dispensed on wall 752 instead of channel 724. In certain instances, non-removable seal may be dispensed within channel 724 on inner wall 720 or outer wall 722. Wall 752 includes a clasping feature 754, configured here as a protrusion, that interacts with a corresponding clasping feature 730 disposed on outer wall 722 of top member 700, configured here as a second protrusion. A second set of corresponding clasping features is also present. Clasping feature 756 (configured here as a protrusion) on wall 752 clasps clasping feature 732 (also configured as a protrusion) on inner wall 720. In some embodiments, clasping features 754 and 730 may be the only clasping features present; in certain instances, clasping features 756 and 732 may be the only clasping features present. Other types of corresponding clasping features may be utilized, such as a protrusion and a receiving member (see FIG. 8B, described below).

Figure 8A:
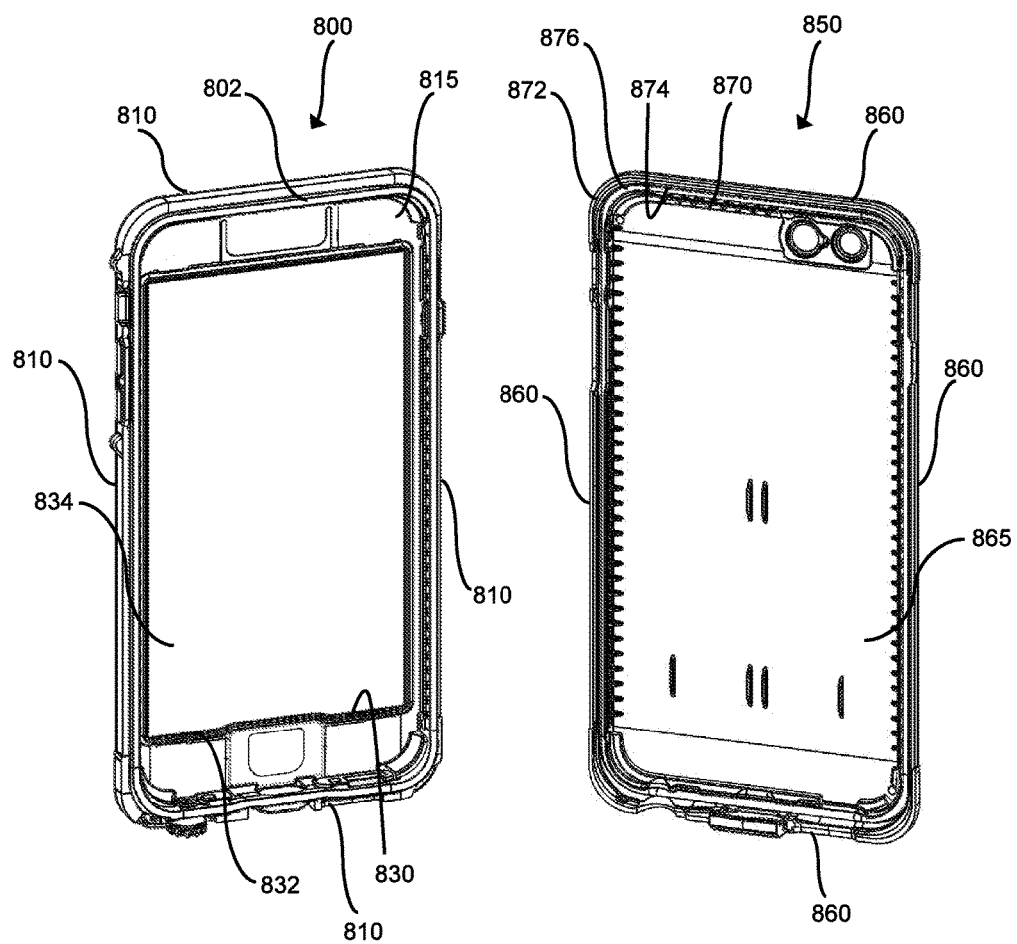
FIG. 8A is a perspective view of the inner surfaces of two members of another embodiment of a protective enclosure.

FIG. 8A shows an embodiment of an enclosure or encasement having a channel in the bottom member and a wall for entering the channel in the top member. The enclosure or encasement also includes an inside edge for sealing directly to the front surface of an enclosed electronic device (not shown in FIG. 8A; see FIG. 8D). Top member 800 has an inner surface 815 that is not exposed when coupled or clasped with bottom member 850. The front surface of the electronic device that is encased by top member 800 and bottom member 850 includes a touch-sensitive display. In the embodiment depicted in FIG. 8A, inner surface 815 of top member 800 includes an inside edge 830 defining an aperture 834. Aperture 834 exposes the touch-sensitive display of an installed electronic device. Inside edge 830 also includes a non-removable seal 832 dispensed or extruded onto inner surface 815 (see disclosure herein), and contacts the front surface of an installed electronic device (see FIGS. 8C-8D and described further below).

Bottom member 850 has a perimeter portion 860 with a channel 874 defined by an inner wall 870 and an outer wall 872. Channel 874 includes a non-removable seal 876 dispensed or extruded by the methods disclosed herein. Bottom member 850 also has an inner surface 865 that contacts the back surface of an installed electronic device. Perimeter portion 860 of bottom member 850 corresponds with perimeter portion 810 of top member 800. Top member 800 includes a wall 802 configured to at least partially enter channel 874 of the bottom member; wall 802 extends from perimeter portion 810. Clasp features on the inner wall 870 and outer wall 722 of bottom member 850, and wall 802 of top member 800 are shown in more detail in FIG. 8B. The clasp features removably interact in order to clasp and maintain top member 800 and bottom member 850 together and compress non-removable seal 876, creating a waterproof barrier between the top and bottom members. In some embodiments, the clasp features described for FIGS. 8A-8B may not include an inside edge 830 and aperture 834, instead having a transparent membrane as described for FIG. 7A above, or a transparent membrane adhered to inside edge 830.

Figure 8B:
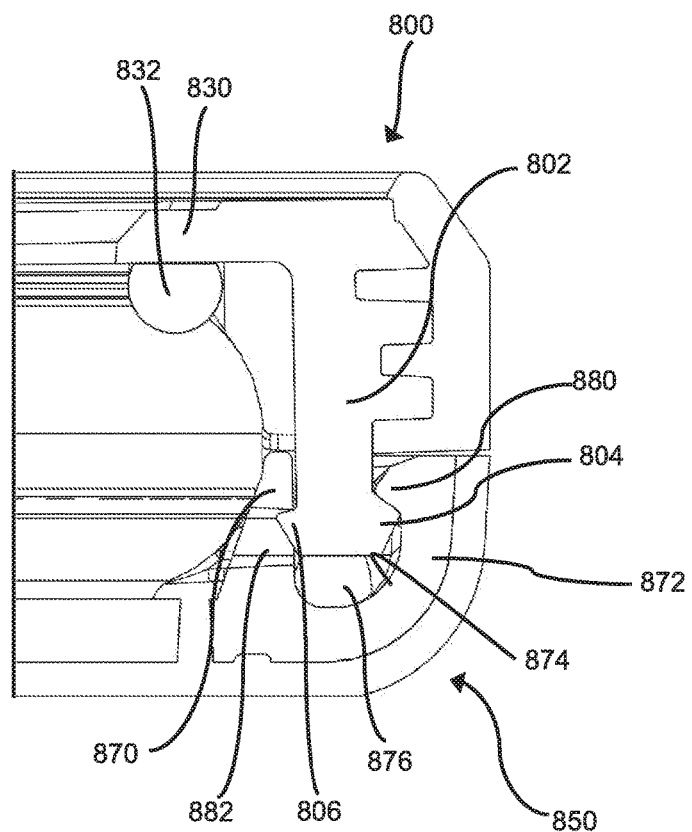
FIG. 8B is a partial side sectional view of the two member of FIG. 8A clasped together, showing a channel and gasket in the bottom member and a wall in the top member.

FIG. 8B illustrates a side sectional view of top member 800 and bottom member 850 while clasped together, without an electronic device. Channel 874 of bottom member 850 is defined by inner wall 870 and outer wall 872. Non-removable seal 876, dispensed on channel 874 is partially compressed by wall 802 of top member 800. In some embodiments, non-removable seal 876 may be dispensed on wall 802 instead of channel 874. In certain instances, non-removable seal may be dispensed within channel 874 on either inner wall 870 or outer wall 872. Wall 802 of top member 800 includes a clasping feature 804, configured here as a protrusion, that interacts with a corresponding clasping feature 880 disposed on outer wall 872 of bottom member 850, configured here as a second protrusion. A second set of corresponding clasping features is also present. Clasping feature 806 (configured here as a protrusion) on wall 802 clasps with clasping feature 882 (configured here as a receptacle or receiving member that receives clasping feature 806) on inner wall 870. In some embodiments, clasping features 880 and 804 may be the only clasping features present; in certain instances, clasping features 806 and 882 may be the only clasping features present. Other types of corresponding clasping features may also be utilized in combination with the clasping features shown.

FIG. 8B also shows inside edge 830 with second non-removable seal 832 dispensed or extruded thereon, using methods described herein. FIG. 8C shows another side sectional view of top member 800 and bottom member 850 with inside edge 830 and non-removable seal 832. No electronic device is installed within top member 800 and bottom member 850. FIG. 8D shows an electronic device 900 installed in top member 800 and bottom member 850, with non-removable seal 832 partially compressed against front surface 902 of electronic device 900.

The description herein of enclosure members with a formed-in-place seal includes encasements or cases that surround an electronic device having its own separate housing. Enclosures and encasements with dispensed seals may also be used as housings for electronic components of an electronic device. An enclosure may be arranged or configured to enclose any item that the user wishes to protect from water, particulates, or other contaminants. Electronic devices may include portable electronic devices, such as smartphones, electronic tablets, portable computers, portable media players, personal digital assistants, smartwatches, portable gaming systems, satellite navigation receivers (e.g. a GPS receiver), or fitness monitors and the like. Electronic devices contained by an enclosure or encasement described herein may have a variety of shapes and sizes, and enclosures and encasements for a given electronic device may correspond with the shape of the electronic device. Electronic devices contained or encased by enclosures described herein may have a variety of shapes and sizes, including rectangular, square, polygonal, round, elliptical, or some irregular shape. The electronic device housing may have a front surface and a back surface that are defined by a perimeter portion. One or both of the front surface, back surface, and perimeter portion may include a display (e.g. touch-sensitive display, touchscreen) and/or an interactive control panel.

Rectangular housings for an electronic device may have two ends, e.g. a first end and a second end, that each form part of respective proximal and distal portions of the electronic device. A rectangular electronic device housing may also have first and second sides that are opposite one another, and that separate the first and second ends of the device from each other. Likewise, the first and second ends of the electronic device housing include third and fourth sides. An electronic device housing may be square, such that the first, second, third, and fourth sides are substantially equal to each other. The first, second, third, and fourth sides may be flat, curved, or include multiple flattened surfaces to approximate a rounded side. Rectangular electronic devices (and any polygonal electronic device with corners) also have corners, and in various instances the corners may be shaped such that they may be rounded, or may include multiple flattened surfaces to approximate a rounded corner. Together, edge portions of the first and second ends, and first and second sides define a front surface (e.g. where a touchscreen, capacitive touchscreen, interactive control panel, or other display is visible) and a back surface of the electronic device. In some embodiments, an electronic device may have an additional touchscreen, capacitive touchscreen, interactive control panel, or other display on the back surface.

Electronic devices described herein may have shapes other than rectangular, and include perimeters that do not include sides and/or corners. For example, the electronic device may be triangular, pentagonal, hexagonal, etc. If the electronic device is a polygon, the sides of the polygon may or may not be equal in length. The electronic device may also be round or elliptical. The electronic device may also have a combination of flat sides and rounded sides. Electronic devices may also have round, curved, elliptical, oval, or ovoid shapes, alone or in combination with polygonal shapes as described above. Electronic devices with curved shapes may also have sides that are flat, rounded, or a combination of both. In some embodiments, an electronic device may have a front surface that gradually tapers to a back surface, leaving no defined "side" in between the front and back surfaces. Similarly, the back surface of an electronic device housing may gradually taper to a front surface, leaving no defined "side" in between the back and front surfaces. Generally, sealing enclosures described herein may be configured to closely fit electronic device housings with rectangular or non-rectangular geometries, and therefore may also have rectangular or non-rectangular geometries as described above.

Enclosure or encasement members include an outer surface and an inner surface, and a perimeter portion that surrounds the inner and outer surfaces. The perimeter portion, inner surface, and outer surface of a first enclosure or encasement member may include a rigid or semi-rigid frame member. At least one encasement or enclosure member includes a seal that is dispensed on an inner surface of the member. The dispensed seal may be positioned proximate the perimeter portion of the enclosure or encasement member. Two enclosure members having at least one dispensed seal may be combined with each other to form a waterproof enclosure that surrounds an electronic device housing.

A first enclosure member may be a bottom member or a top member, with the second enclosure member being the corresponding top member or bottom member, respectively, to mate with the first enclosure member. In some embodiments, the inner surface of either the first or second enclosure member may include a channel into which the seal is dispensed. The seal may also be dispensed on, or proximate with, a wall of the first enclosure member, such as an extended wall. Exemplary encasements and enclosures are described in U.S. Pat. No. 8,342,325, U.S. Pat. No. 8,531,834, and U.S. Pub. No. 2014/0152890, the contents of each of which are incorporated by reference in their entirety. In such embodiments, the second enclosure member may include a wall or ridge on its inner surface that fits into a channel or is positioned proximate another wall of the first enclosure member and compresses the dispensed seal. In some embodiments, the inner surface of the frame member may not have a channel, and the seal may be dispensed directly on the perimeter portion of the inner surface. For example, seals that are not contained in a channel are described in U.S. Pub. No. 2014/0339104, incorporated by reference herein in its entirety. The seal may also be dispensed on a portion of a wall on an enclosure member, such that it seals against a surface of another wall extending from the other enclosure member.

Each of the first and second enclosure members may also include clasping features that removably interact with each other to press the first and second enclosure members together, compressing the seal, and forming a watertight barrier. Exemplary coupling features may include reciprocal catches and hooks, teeth, and/or corresponding holes, hinged latches, and the like. The clasping features may be entirely internal to the encasement or enclosure, entirely external to the encasement or enclosure, or a hybrid of both internal and external clasping features. Exemplary clasp features are disclosed in U.S. Pat. No. 8,342,325, U.S. Pat. No. 8,531,834, U.S. Pub. No. 2014/0152890, and U.S. Pub. No. 2014/0339104, the contents of each of which are incorporated by reference in their entirety. In some embodiments of a first enclosure member with a channel, the channel may include the first clasp feature, and a ridge or extended wall of the second enclosure member may include the second clasp feature. In certain instances, a wall of the first enclosure member may include a first clasping feature that interacts with a second clasping feature on another wall extending from the second enclosure member.

Certain embodiments of enclosure or encasement members may include a frame portion that frames a touch-sensitive display of an electronic device, and a seal having multiple lengths on the inner surface of the frame portion. The frame portion includes an inside edge defining an aperture in the encasement or enclosure member. The inner surface of the encasement or enclosure member proximate the inside edge may include a dispensed seal. When the electronic device is encased by an encasement member having a frame portion, the seal on the inside edge contacts the region of the electronic device proximate the touch-sensitive display, forming a watertight seal directly with the front surface of the electronic device housing. Seals on the frame portion of the enclosure or encasement member may have three lengths or portions, six lengths or portions, or more than six lengths or portions, including overlapping seal lengths with ramped and inverted ramp configurations, and a combined thickness, volume, or cross-sectional area that is substantially equal to that of another length. Exemplary enclosures allowing waterproof, yet direct touch access to an encased electronic device are described in U.S. Pat. No. 8,531,834, the contents of which are incorporated by reference in their entirety.

Figure 9A:
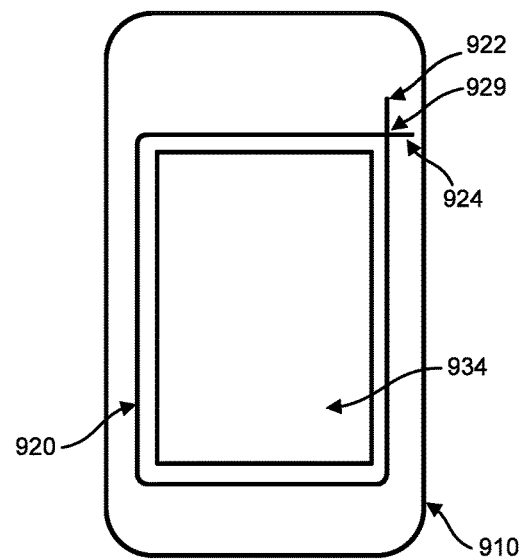
FIG. 9A illustrates a top view of a member of a protective encasement having a dispensed seal.

FIG. 9A illustrates a top view of a member 910 of a protective encasement having a dispensed seal 920. Member 910 may be an example of any of the covers, protective covers, encasements, protective encasements, or portions thereof discussed herein, including members 600, 700, and 800. Member 910 may be a top member of a protective encasement, a bottom member of a protective encasement, a first member of protective encasement, a second member of a protective encasement, or may be the entire protective encasement. Member 910 may also be a cover, any part of a cover, a protective cover, and/or any part of a protective cover. Member 910 may include one or more apertures or openings, such as aperture 934, through which some portion of an electronic device may be accessible while installed in the protective encasement. The seal variations and techniques illustrated in FIGS. 9A, 9B, 10, and 11 may also be used with any of the other encasements, covers, elements, features, seals, and/or techniques disclosed herein.

As discussed in previous examples, various challenges may exist with producing a dispensed seal having a uniform thickness, a nearly uniform thickness, a constant thickness, or a substantially uniform thickness. This is particularly true with respect to the beginning and ending points of the seal in the dispensing process due to the starting and stopping of the flow of the elastomeric material. Dispensed seal 920 provides a variation of other solutions discussed herein where the ends of the dispensed seal are not relied upon as being part of the sealing surface. This approach may provide a more reliable and/or easier to produce seal because the starting and stopping of the dispensing process are often the most challenging to control or perform on a repeatable basis.

Dispensed seal 920 may include any of the features, functions, characteristics, and/or elements of any of the other dispensed seals discussed herein. Dispensed seal 920 includes a first or starting end 922 and a second or finishing end 924. In some cases, these ends may ramp up and ramp down as illustrated in FIGS. 1A-1C due to the characteristics and physical behaviors of the dispensing process and the elastomeric material. However, in this example, first end 922 and second end 924 are not overlapped or combined to achieve a seal of a specific height because first end 922 and second end 924 are not relied upon for the sealing function and, therefore, are not subject to height requirements or controls. Instead, first end 922 and second end 924 are loose "tails" that do not make up part of the primary sealing surface or gasket area.

Dispensed seal 920 relies on an intersection or overlap of the bead of elastomeric material at overlap point 929. Overlap point 929 completes the closed loop which is used as the primary sealing surface or gasket area and allows first end 922 and second end 924 to have characteristics which do not affect the desired sealing behavior. In other words, only the closed loop portion is subject to height requirements in order to meet sealing requirements and reduce the possibility of leaks. However, overlap point 929 may still need to meet height requirements. In other words, overlap point 929 may still need to have a height that is the same, or substantially the same, as the other portions of the loop and/or the primary region of the loop of dispensed elastomeric material. However, reducing the thickness of the dispensed elastomeric material in a particular region may be less difficult, more controllable, and/or more repeatable than relying on or trying to control the characteristics of the bead when it is fully stopped or started. Changing the thickness in any particular region of the bead or at any particular point on the bead may be accomplished by temporarily changing the flow rate of the elastomeric material and/or temporarily changing the rate of relative movement between the nozzle and member 910. Changing the rate of relative movement may be accomplished by moving the nozzle, the member, or both.

Figure 9B:
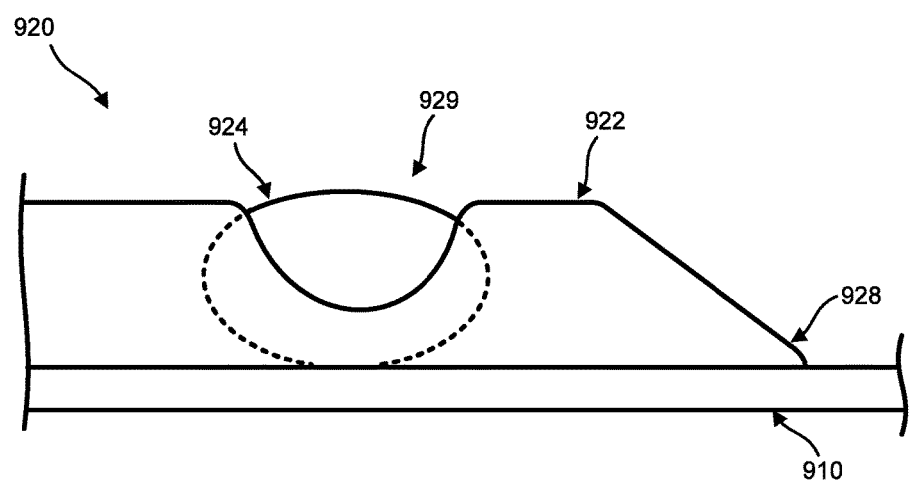
FIG. 9B illustrates a side sectional view of the dispensed seal of FIG. 9A.

FIG. 9B illustrates a side sectional view of dispensed seal 920 at overlap point 929. First end 922 tapers off or ramps down to end point 928 as described in other examples herein. However, more importantly, the height of seal 920 at overlap point 929 remain the same, or substantially the same, as the height of other portions of seal 920 thereby increasing the reliability of providing a watertight seal, waterproof seal, watertight barrier, or waterproof barrier when placed against another surface, particularly a planar surface. While being dispensed, the height of seal 920 is reduced near overlap point 929 on both the first and the second pass through overlap point 929. The reduced thickness portions of the seal may also be referred to as reduced thickness regions. The objective is to produce an overlapped seal where the combined height of the two reduced thickness portions, dispensed in different passes past the same point, is the same or similar to the remainder of the seal. In some situations, the two reduced thickness portions may each have a height of approximately one half of the overall desired or combined height. In other situations, each reduced height portion or region may have a height that is greater than zero, but is not the same as the other reduced height portion or region.

In one specific example, a protective encasement comprising a first member, such as member 910, includes a perimeter portion. The protective encasement may also include a second member including a perimeter portion that corresponds with the perimeter portion of member 910. Each of member 910 and the other member may include a channel and/or a wall disposed proximate the respective perimeter portion. The members may also include a first clasping feature proximate the wall and a second clasping feature proximate the channel. The clasping features may be configured for interfacing to removably clasp the members together to removably encase the electronic device. The protective encasement further includes a dispensed seal 920 disposed on an inside surface of member 910 to form a watertight barrier between the member 910 and a surface of the installed electronic device when the members are removably clasped together. Dispensed seal 920 may comprise an elastomeric material dispensed on and adhered to the inside surface of member 910. Dispensed seal 920 may include first end 922 and second end 924. A first overlap region of dispensed seal 920 may overlap a second overlap region dispensed seal 920 at overlap point 929 to form a closed loop. The closed loop may have a substantially uniform seal thickness to form the watertight barrier between member 910 and the surface of the installed electronic device. The first and second overlap regions each have reduced thicknesses that are less than the uniform seal thickness. A combined thickness of the first overlap region and the second overlap region at overlap point 929 substantially equals the uniform seal thickness to complete the closed loop having the substantially uniform seal thickness.

FIG. 10 illustrates a dispensed seal 1020. Dispensed seal 1020 may include any of the features, functions, characteristics, and/or elements of any of the other dispensed seals discussed herein. Although not illustrated in FIG. 10, dispensed seal 1020 may be applied to any of the cases, covers, encasements, or portions thereof, discussed herein. Dispensed seal 1020 has a starting end 1022 and a finishing end 1027. Similar to first end 922, starting end 1022 does not necessarily have full height and does not form part of the primary sealing loop, surface, or region. Finishing end 1027 of dispensed seal 1020 meets the already dispensed portion of the bead at merge region 1024. Finishing end 1027 may discontinue abruptly or may ramp down. In some configurations, finishing end 1027 may veer off slightly to the side of the existing bead rather than being dispensed directly on or over it. Beneficially, this approach does not require the potentially less controllable characteristics of the starting of the bead to be relied upon for forming the sealing surface or loop. In one variation, this example may be reversed in that the starting portion of the bead may be included in the sealing surface or loop but the finishing end may not.

Figure 11:
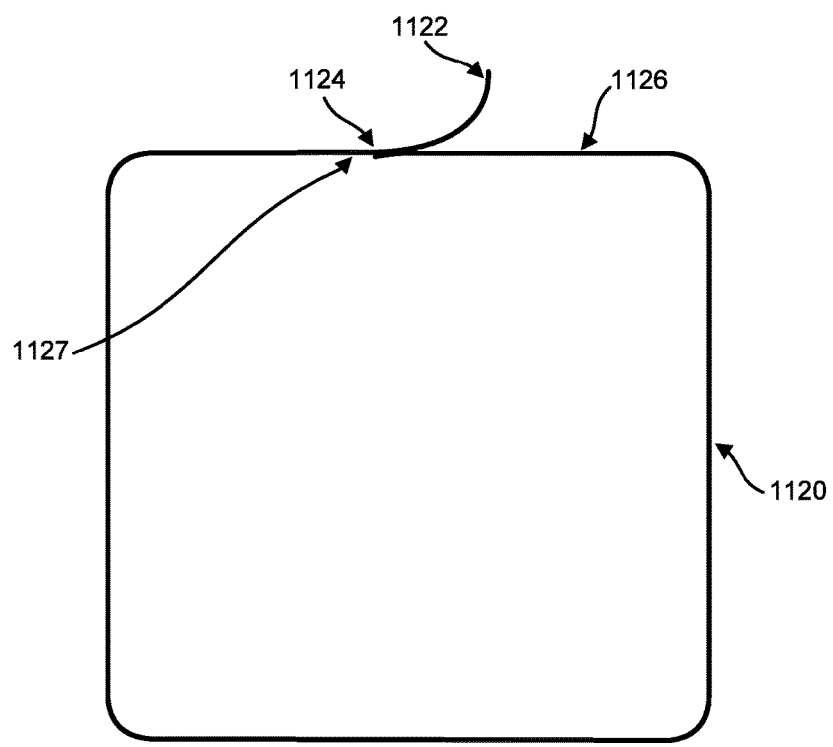
FIG. 11 illustrates an alternate embodiment of a dispensed seal.

FIG. 11 illustrates a dispensed seal 1120. Dispensed seal 1120 may include any of the features, functions, characteristics, and/or elements of any of the other dispensed seals discussed herein. Although not illustrated in FIG. 11, dispensed seal 1120 may be applied to any of the cases, covers, encasements, or portions thereof, discussed herein. Dispensed seal 1120 has a starting end 1122 and a finishing end 1127. Similar to first end 922, starting end 1122 does not necessarily have full height and does not form part of the primary sealing surface or region. As it is being applied, the direction of the bead is reversed or abruptly or significantly changed at inflection point 1124 before continuing along path 1126. Finishing end 1127 of dispensed seal 1120 meets the already dispensed portion of the seal at merge region 1024. Changing direction of a bead as it is applied may result in useful characteristics such as an additional quantity of material being dispensed at the spot or, alternatively, a lesser amount of material being dispensed at that spot. The change in direction may also be accompanied by a change in the flow rate and/or a change in the rate of movement to accomplish a particular bead characteristic at that location. In other words, the change of direction at inflection point 1124 may beneficially provide a bead shape and/or bead characteristics that are better suited for maintaining a constant height, or near constant height, when finishing end 1127 reaches inflection point 1124 and completes the loop.

It should be understood that any of the techniques disclosed herein may be used for dispensing a seal or gasket that provides a seal between two members of a case in addition to or in place of dispensing a seal or gasket that provides a seal between one of the members and an electronic device. It should also be understood that any of the techniques disclosed herein may be implemented in the form of a method of dispensing a seal or gasket on a case, cover, encasement, or any portion thereof.

The above figures may depict exemplary configurations for an apparatus of the disclosure, which is done to aid in understanding the features and functionality that can be included in the housings described herein. The apparatus is not restricted to the illustrated architectures or configurations, but can be implemented using a variety of alternative architectures and configurations. Additionally, although the apparatus is described above in terms of various exemplary embodiments and implementations, it should be understood that the various features and functionality described in one or more of the individual embodiments with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read to mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. Additionally, where a range is set forth, the upper and lower limits of the stated range are each inclusive of all of the intermediary units therein.

The foregoing description is intended to illustrate, but not to limit, the scope of the disclosure, which is defined by the scope of the appended claims. Other embodiments are within the scope of the following claims.

What is claimed:

1. A protective encasement for an electronic device having a display, the protective encasement comprising:
   a first member including a perimeter portion;
   a second member including a perimeter portion that corresponds with the perimeter portion of the first member;

a channel disposed proximate the perimeter portion of one of the first member and the second member;

a wall disposed proximate the perimeter portion of another of the first member and the second member;

a first clasping feature proximate the wall and a second clasping feature proximate the channel, the first and second clasping features interfacing to removably clasp the first and second members together to removably encase the electronic device when the electronic device is installed in the protective encasement; and a dispensed seal disposed on an inside surface of the first member to form a watertight barrier between the first member and a surface of the installed electronic device when the first and second members are removably clasped together, the dispensed seal comprising an elastomeric material dispensed on and adhered to the inside surface of the first member, the dispensed seal comprising a first end and a second end, wherein a first overlap region of the dispensed seal overlaps a second overlap region of the dispensed seal at an overlap point to form a closed loop, the closed loop having a substantially uniform seal thickness to form the watertight barrier between the first member and the surface of the installed electronic device when the first member is removably clasped to the second member, wherein the first and the second overlap regions each have reduced thicknesses that are less than the uniform seal thickness, wherein a combined thickness of the first overlap region and the second overlap region at the overlap point substantially equals the uniform seal thickness to complete the closed loop having the substantially uniform seal thickness, and wherein at least one of the first end and the second end of the dispensed seal have a ramped configuration that is not part of the closed loop.

2. The protective encasement of claim 1 wherein the first member includes an aperture enabling direct touch access to the display of the installed electronic device, wherein the closed loop of the dispensed seal extends around the aperture to form the watertight barrier between the first member and the surface of the installed electronic device when the first and second members are removably clasped together.

3. The protective encasement of claim 1 wherein the surface of the installed electronic device with which the watertight barrier is formed is proximate a perimeter of the display.

4. The protective encasement of claim 1 wherein the first member at least partially covers the display of the installed electronic device.

5. The protective encasement of claim 1 wherein the first member is treated with ultraviolet light on at least the inside surface on which the dispensed seal is disposed to increase adhesion of the dispensed seal to the inside surface.

6. The protective encasement of claim 1 further comprising a second seal to form a waterproof barrier between the first and the second members when the first and the second members are removably clasped together.

7. The protective encasement of claim 6 wherein the second seal is positioned in the channel.

8. The protective encasement of claim 6 wherein the second seal is a dispensed seal disposed on one of the first and the second members.

9. The protective encasement of claim 1 wherein the first clasping feature is on a surface of the wall and the second clasping feature is on a surface of the channel.

10. The protective encasement of claim 1 wherein the reduced thickness of the first overlap region is substantially equal to the reduced thickness of the second overlap region.

11. The protective encasement of claim 1 wherein:
the reduced thickness of the first overlap region is not equal to the reduced thickness of the second overlap region; and
both the reduced thickness of the first overlap region and the reduced thickness of the second overlap region are greater than zero.

12. The protective encase of claim 1 wherein at least one of the first end and the second end extend beyond the closed loop.

13. The protective encasement of claim 1, wherein the first and the second overlap regions each have a reduced thicknesses that is approximately one half the uniform seal thickness.

14. A protective cover for an electronic device having a display, the protective cover comprising:
a shell member removably attachable to a second shell member using one or more clasping features; and
a bead of elastomeric material adhered to an inside surface of the shell member to form a gasket on the inside surface of the shell member, the gasket configured for providing a watertight barrier between the shell member and another surface when the electronic device is installed in the protective cover, the gasket comprising a first end, a second end, a first overlap region, a second overlap region, and a primary region that is between the first overlap region and the second overlap region, the first overlap region of the gasket overlapping the second overlap region at an overlap point to form a closed loop that includes the primary region of the gasket, the primary region having a substantially uniform thickness to form the watertight barrier, the first and second overlap regions each having respective thicknesses such that a combined overlapped thickness of the first overlap region and the second overlap region at the overlap point substantially equals the thickness of the primary region to form the closed loop having the thickness of the primary region, the bead of elastomeric material dispensed onto the shell member while in a flowable state, wherein at least one of the first end and the second end of the gasket have a ramped configuration that is not part of the closed loop.

15. The protective cover of claim 14 wherein:
the shell member includes an aperture for accessing the display of the electronic device when the electronic device is in the protective cover;
the gasket is positioned on the inside surface of the shell member proximate the aperture; and
the watertight barrier is formed between the shell member and a surface of the installed electronic device that is proximate the display.

16. The protective cover of claim 15 further including a second gasket for creating a watertight seal between the shell member and the second shell member when the shell member is removably attached to the second shell member using the one or more clasping features.

17. The protective cover of claim 16 wherein the one or more clasping features includes a channel and the second gasket is positionable in the channel.

18. The protective cover of claim 14 wherein:
the gasket is positioned on the shell member to contact the second shell member when the shell member is removably attached to the second shell member to at least partially enclose the electronic device; and
the watertight barrier is formed through compression of the gasket between the shell member and the second shell member when the shell member is removably attached to the second shell member.

* * * * *